(12) United States Patent
Elazzouni et al.

(10) Patent No.: US 12,213,175 B2
(45) Date of Patent: Jan. 28, 2025

(54) INTER-USER-EQUIPMENT SCHEDULING FOR SIDELINK COMMUNICATIONS

(71) Applicant: QUALCOMM Incorporated, San Diego, CA (US)

(72) Inventors: Sherif Elazzouni, San Diego, CA (US); Ozcan Ozturk, San Diego, CA (US); Junyi Li, Fairless Hills, PA (US); Xiaoxia Zhang, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/713,100

(22) Filed: Apr. 4, 2022

(65) Prior Publication Data
US 2023/0319883 A1 Oct. 5, 2023

(51) Int. Cl.
*H04W 72/04* (2023.01)
*H04W 72/1263* (2023.01)
*H04W 74/00* (2009.01)
*H04W 74/08* (2009.01)
*H04W 74/0816* (2024.01)
*H04W 76/14* (2018.01)

(52) U.S. Cl.
CPC ... *H04W 74/0816* (2013.01); *H04W 72/1263* (2013.01); *H04W 74/002* (2013.01); *H04W 74/0866* (2013.01); *H04W 76/14* (2018.02)

(58) Field of Classification Search
CPC .......... H04W 74/0816; H04W 74/002; H04W 74/0866; H04W 74/0808; H04W 72/1263; H04W 72/40; H04W 72/25; H04W 76/14; H04W 16/14; H04W 92/18
See application file for complete search history.

(56) References Cited

U.S. PATENT DOCUMENTS

| | | | |
|---|---|---|---|
| 2007/0115907 A1* | 5/2007 | Myles | H04W 16/14 370/395.2 |
| 2015/0373652 A1* | 12/2015 | Dabeer | H04W 52/262 455/522 |
| 2018/0152915 A1* | 5/2018 | Kalhan | H04W 88/04 |
| 2019/0053203 A1* | 2/2019 | Xu | H04W 88/04 |
| 2019/0254059 A1* | 8/2019 | Gulati | H04W 72/542 |
| 2020/0178268 A1* | 6/2020 | Duengen | H04W 74/004 |
| 2020/0236655 A1* | 7/2020 | Bharadwaj | H04L 5/0051 |
| 2021/0250954 A1* | 8/2021 | Li | H04L 1/1854 |
| 2023/0345529 A1* | 10/2023 | Van Phan | H04W 74/002 |

* cited by examiner

*Primary Examiner* — Mahbubul Bar Chowdhury
(74) *Attorney, Agent, or Firm* — Kevin M. Donnelly; Holland & Hart LLP

(57) ABSTRACT

Methods, systems, and devices for wireless communication are described. A first user equipment (UE) may communicate one or more messages associated with establishing a sidelink communication connection with a set of UEs, including a second UE. The first UE may transmit a message indicating that the first UE has a data transmission to send. The second UE may receive the message and transmit an indication that a first set of resources is allocated to the first UE for the data transmission. In some examples, the second UE may broadcast the indication that the first set of resources is allocated to the first UE. The first UE may transmit the data transmission over the resources based on receiving the indication that the first set of resources is allocated to the first UE. In some examples, the first UE may perform a listen before talk procedure prior to transmitting the data transmission.

25 Claims, 15 Drawing Sheets

INTER-USER-EQUIPMENT SCHEDULING FOR SIDELINK COMMUNICATIONS

TECHNICAL FIELD

The following relates to wireless communications, including inter-user-equipment scheduling for sidelink communications.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, multiple UEs may communicate with each other via sidelink communications. For example, UEs may operate in an autonomous sidelink communications system (such as a system in which UEs may schedule communications and communicate signals, among other examples, without the aid of a network entity such as a base station). However, techniques for scheduling in such systems may be deficient. For example, the UEs may experience interference from other UEs in the system, relatively high signaling overhead, or both, among other issues.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes communicating one or more messages associated with establishing a sidelink communication connection with each of a set of UEs, transmitting, to a second UE of the set of UEs based on communicating the one or more messages associated with establishing the sidelink communication connection, a message indicating that the first UE has a data transmission for one or more UEs of the set of UEs, receiving, from the second UE and broadcasted over a second set of resources, an indication that a first set of resources is allocated to the first UE for the data transmission, and transmitting the data transmission over the first set of resources based on receiving the indication that the first set of resources is allocated to the first UE for the data transmission.

Another innovative aspect of the subject matter described in this disclosure can be implemented in a method for wireless communication. The method includes communicating one or more messages associated with establishing a sidelink communication connection with each of a set of UEs, receiving, from a second UE of the set of UEs, a message indicating that the second UE has a data transmission for one or more UEs of the set of UEs based on communicating the one or more messages associated with establishing the sidelink communication connection, selecting a first set of resources for the data transmission based on receiving the message, and broadcasting, to the set of UEs and over a second set of resources, an indication that the first set of resources is allocated to the second UE for the data transmission.

Another innovative aspect of the subject matter described in this disclosure can be implemented in an apparatus for wireless communication. The apparatus includes a processor, and memory coupled with the processor and storing instructions executable by the processor to cause the apparatus to communicate one or more messages associated with establishing a sidelink communication connection with each of a set of UEs, transmit, to a second UE of the set of UEs based on communicating the one or more messages associated with establishing the sidelink communication connection, a message indicating that the first UE has a data transmission for one or more UEs of the set of UEs, receive, from the second UE and broadcasted over a second set of resources, an indication that a first set of resources is allocated to the first UE for the data transmission, and transmit the data transmission over the first set of resources based on receiving the indication that the first set of resources is allocated to the first UE for the data transmission.

Another innovative aspect of the subject matter described in this disclosure can be implemented in an apparatus for wireless communication. The apparatus includes a processor, and memory coupled with the processor and storing instructions executable by the processor to cause the apparatus to communicate one or more messages associated with establishing a sidelink communication connection with each of a set of UEs, receive, from a second UE of the set of UEs, a message indicating that the second UE has a data transmission for one or more UEs of the set of UEs based on communicating the one or more messages associated with establishing the sidelink communication connection, select a first set of resources for the data transmission based on receiving the message, and broadcasting, to the set of UEs and over a second set of resources, an indication that the first set of resources be allocated to the second UE for the data transmission.

DETAILED DESCRIPTION

Figure 1:
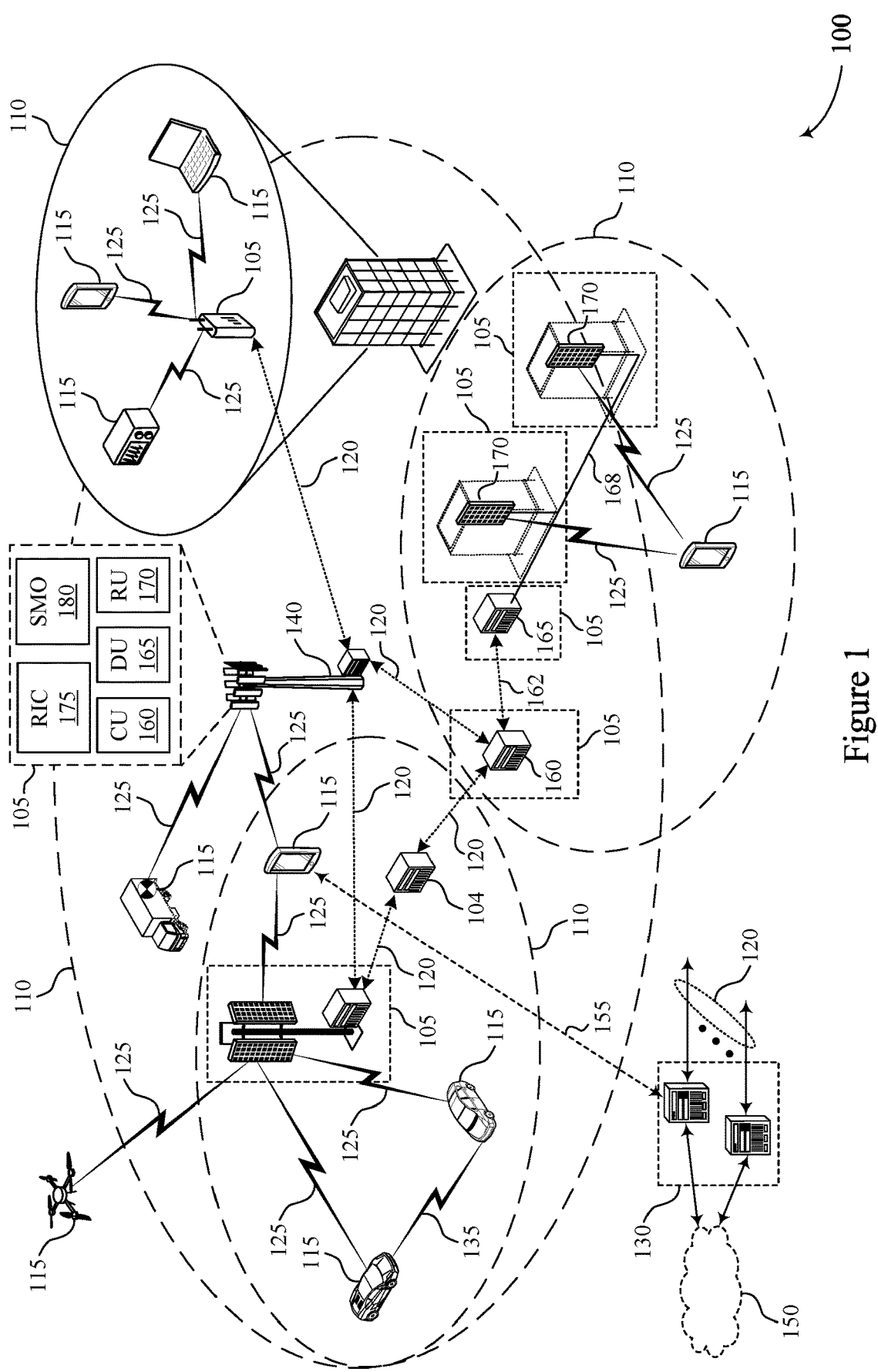
FIG. 1 illustrates an example of a wireless communications system that supports inter-UE scheduling for sidelink communications in accordance with one or more aspects of the present disclosure.

Some wireless communications systems may support sidelink communications between devices. For example, user equipments (UEs) may communicate with each other via sidelink communications. In some examples, the UEs may operate in a first sidelink resource allocation mode (for example, mode 1, which may be referred to as a network entity semi-controlled mode), in which the network entity, such as a base station, schedules the sidelink communications. Additionally or alternatively, the UEs may operate in a second sidelink resource allocation mode (for example, mode 2, which may be referred to as an autonomous mode) in which one or more user equipments (UEs) autonomously schedules the sidelink communications (for example, the UEs schedules communications without the aid of the network entity, such as the base station). However, scheduling procedures and communications in such systems may be deficient. For example, the UEs may experience interference from other UEs in the system, relatively high signaling overhead, or both, among other issues.

Various aspects generally relate to sidelink communications, and more specifically, to one or more schemes for inter-UE sidelink scheduling and communications. For example, a first UE may receive an indication that a second UE has data for transmission. The first UE may perform sensing on resources and select a first set of resources for communication of the data based on the sensing. The first UE may indicate the selected first set of resources. In accordance with the various aspects described herein, the first UE may broadcast such an indication to multiple UEs in the system (for example, the first UE may broadcast or groupcast an indication that the first set of resources are reserved for the second UE to other devices in the system that may transmit communications). Additionally or alternatively, the second UE may perform a listen before talking (LBT) procedure prior to transmitting the data. For example, the second UE may perform the LBT procedure on a sub-channel associated with the first set of resources (for example, the second UE may transmit the data or refrain from transmitting the data based on a result of the LBT procedure). In some examples, the first UE may communicate inter-UE coordination and scheduling information with other UEs, including with the second UE. For example, the first UE may receive coordination information from other UEs (e.g., indications of resources reserved by one or more other UEs) and the first UE may select the resources for the second UE based on the coordination information. In some examples, the second UE may perform partial sensing prior to transmitting the data (for example, the second UE may sense only a subset of resources from the first set of resources for communicating the data). For example, the second UE may sense a portion of resources indicated by the first UE as candidates, and the second UE may select resources for the data transmission from the portion of resources. The second UE may then transmit the data on the subset of resources based on the outcome of the partial sensing.

Particular aspects of the subject matter described in this disclosure may be implemented to realize one or more of the following potential advantages. The techniques employed by the described communication devices provide benefits and enhancements to the operation of the communication devices, including reduced interference, reduced signaling overhead, increased system efficiency, or any combination thereof. For example, the likelihood of another UE transmitting communications on the same resources as the second UE resulting in interference or degraded communications is reduced based on broadcasting an indication of resources selected for the second UE, communicating inter-UE coordination and scheduling information, or both. Additionally or alternatively, the second UE may reduce the likelihood of transmitting on the same resources as other UEs and avoid interference at other devices in the system based on performing the LBT procedure, performing partial sensing and resource selection, or both. The various operations and techniques described herein support improvements to power consumption, reliability of sidelink communications, higher data rates, low latency, or any combination thereof, among other benefits.

Aspects of the disclosure are initially described in the context of wireless communications systems. Aspects of the disclosure are then described in the context of process flows and a resource scheme. Aspects of the disclosure are further illustrated by and described with reference to apparatus diagrams, system diagrams, and flowcharts that relate to scheduling techniques for sidelink communications.

FIG. 1 illustrates an example of a wireless communications system 100 that supports inter-UE scheduling for sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with reference to FIG. 1. The UEs 115 described herein may be able to communicate with various types of devices, such as other UEs 115 or network entities 105, as shown with reference to FIG. 1.

As described herein, a node of the wireless communications system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another over a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 through a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (MC) 175 (for example, a Near-Real Time MC (Near-RT MC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 175 is flexible and may support different functionalities depending upon which functions (for example, network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication over such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support scheduling techniques for sidelink communications. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown with reference to FIG. 1.

The UEs 115 and the network entities 105 may wirelessly communicate with one another via one or more communication links 125 (for example, an access link) over one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," examples in which referring to a network entity 105, may refer to any portion of a network entity 105 (for example, a base station 140, a CU 160, a DU 165, a RU 170) of a RAN communicating with another device (for example, directly or via one or more other network entities 105).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (for example, a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may support scheduling techniques for sidelink communications. For example, a first UE 115 may receive an indication that a second UE 115 has data for transmission. The first UE 115 may perform sensing on resources and select a first set of resources for communicating the data based on the sensing. The first UE 115 may indicate the selected first set of resources. In some examples, the first UE 115 may broadcast such an indication to multiple UEs 115 in the system (for example, the first UE 115 may broadcast or groupcast an indication that the first set of resources are reserved for the second UE 115 to other transmitting devices in the system). In some examples, the second UE 115 may perform an LBT procedure prior to transmitting the data. For example, the second UE 115 may perform the LBT procedure on a sub-channel associated with the first set of resources (for example, the second UE 115 may transmit the data or refrain from transmitting the data based on a result of the LBT procedure). In some examples, the first UE 115 may communicate inter-UE coordination and scheduling information with other UEs 115. In some examples, the second UE 115 may perform partial sensing prior to transmitting the data (for example, the second UE 115 may sense and select a subset of resources from the first set of resources for communicating the data).

Figure 2:
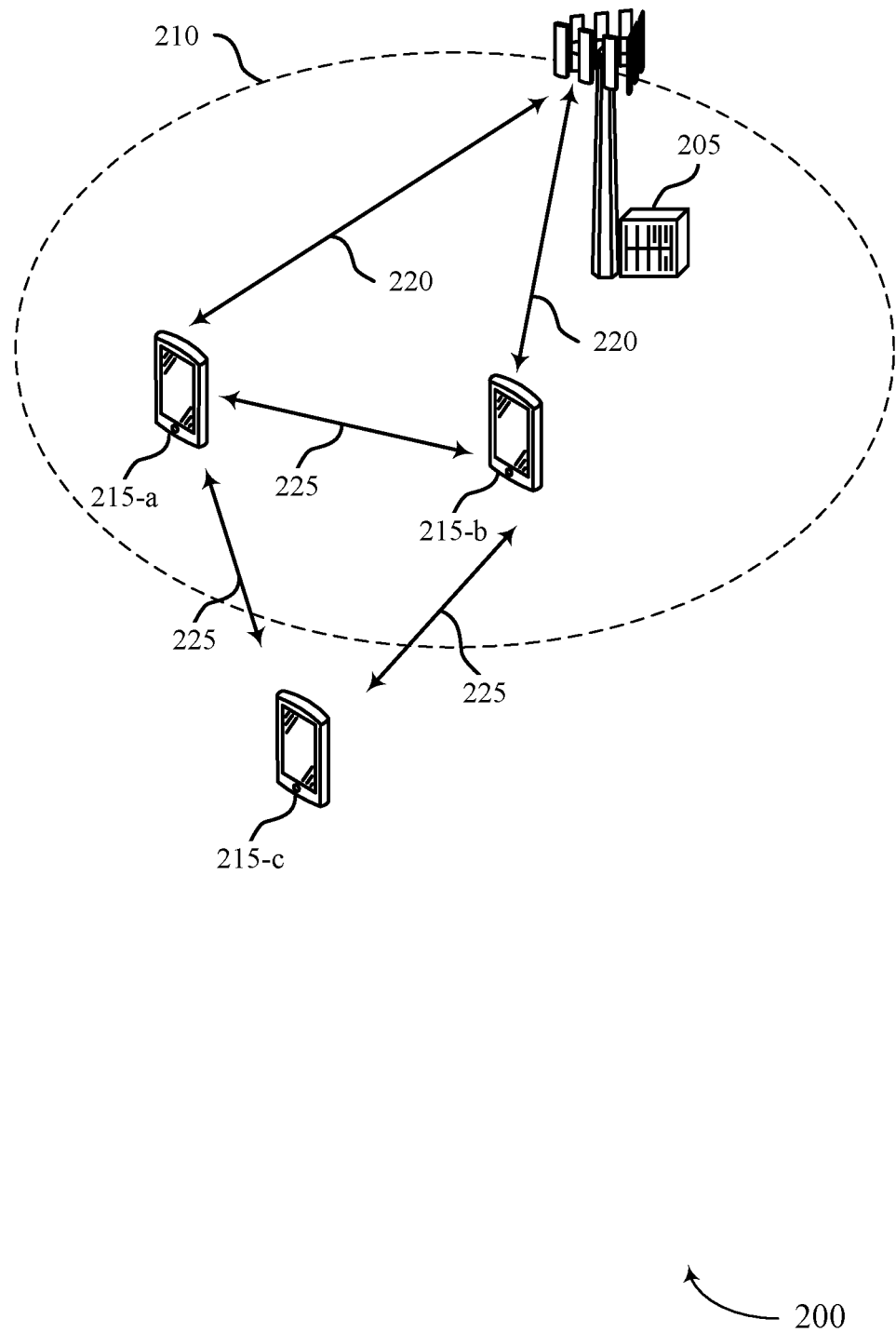
FIG. 2 illustrates an example of a wireless communications system that supports inter-UE scheduling for sidelink communications in accordance with one or more aspects of the present disclosure.

FIG. 2 illustrates an example of a wireless communications system 200 that supports inter-UE scheduling for sidelink communications in accordance with one or more aspects of the present disclosure. The wireless communications system 200 may include a network entity 205, a UE 215-*a*, a UE 215-*b*, and a UE 215-*c*, which may be examples of a network entity 105 and UEs 115 as described with reference to FIG. 1. In some examples, the network entity 205, the UE 215-*a*, the UE 215-*b*, and the UE 215-*c* may be located in a geographic coverage area 210. Although shown with three UEs 215 and a network entity 205 for illustrative clarity, the wireless communications system 200 may include any quantity or type of wireless devices. Additionally or alternatively, some wireless devices may be removed from the wireless communications system 200.

In some examples, the wireless communications system 200 may support a first sidelink mode (for example, mode 1, which may be referred to as a base station semi-controlled mode). For example, the network entity 205 may have some amount of control over the wireless communications system 200 (for example, the network entity 205 may coordinate scheduling or perform scheduling for the UEs 215). As an illustrative example, the UE 215-*a* may be an interface between the UE 215-*c* and the network entity 205. In some examples, the UE 215-*a* may have a Uu connection with the network entity 205 (for example, a Uu RRC connection, a layer 2 (L2) or layer 3 (L3) relay). That is, the UE 215-*a* may communicate with the network entity 205 via an access link 220. In some examples of the first sidelink mode, a joint Uu and PC5 design may be implemented (for example, the network entity 205 may schedule resources for the UE 215-*c*).

Additionally or alternatively, the wireless communications system 200 may support a second sidelink mode (for example, mode 2, which may be referred to as an autonomous mode). For example, the UEs 215 may communicate and schedule such communications without the aid of the network entity 205 (for example, some or all of the UEs 215 may not have an RRC connection to the network entity 205, the network entity 205 may be absent from the system, among other examples). As an illustrative example, the UEs 215 may communicate data and control messaging (for example, resource reservation information) via sidelinks 225.

In some examples, the wireless communications system 200 may support inter-UE scheduling. For example, the UE 215-*a* may be an example of a first type of UE (for example, a "UE-A") capable of performing inter-UE scheduling by selecting resources for another UE 215, such as the UE 215-*c* which may be an example of a second type of UE (for example, a "UE-B") that may receive scheduling information from the UE 215-*a* and transmit on the scheduled resources. In some examples, the UE 215-*c* may connect to a single UE 215-*a* on an RRC level, though any quantity or type of UEs 215 may be used. In some examples, the UE 215-*a* may be a receiver for transmissions from the UE 215-*c*. Stated alternatively, the UE 215-*c* may have data for the UE 215-*a* and the UE 215-*a* may schedule resources to receive the data from the UE 215-*a*. Additionally or alternatively, the UE 215-*c* may broadcast, unicast, or groupcast such data to any UE 215 using resource scheduled by the UE 215-*a*.

In some examples, the wireless communications system 200 may support relay assistance (for example, L2/L3 relay for coverage enhancement) and the UE 215-*c* may receive scheduling by the network entity 205 through the UE 215-*a* as an intermediary device. In some examples, the wireless communications system 200 may support inter-UE scheduling. As an illustrative example, the UE 215-*a* may be an example of a UE 215 with a relatively higher capability than the UE 215-*c* (for example, the UE 215-*c* may be an example of an extended reality (XR) device). In such an example, the UE 215-*a* may perform sensing and resource selection for the UE 215-*c* based on the reduced capability of the UE 215-*c* (for example, reduced power capability, processing capability, among other examples). In some examples, the wireless communications system 200 may support reduced sensing techniques. For example, a portion of the UEs 215 may be configured to perform resource selection and sensing for another portion of the UEs 215. By having partially centralized sensing and resource selection performed by the portion, the system may realize reduced collisions and interference (for example, interference due to a relatively high quantity of nodes performing sensing resulting in high resource exclusions or more collisions or both). Such reduced sensing may result in increased power savings and reliability in the wireless communications system 200.

In some examples, the UEs 215 may establish a connection with each other. For example, the UEs 215 may communicate one or more messages associated with establishing a sidelink connection (for example, a PC5 connection). As a merely illustrative example, the UE 215-*c* may establish a connection with the UE 215-*a* by transmitting a connection request message (for example, a PC5-S connection request message as part of an inter-UE scheduling procedure). The UE 215-*a* may exchange one or more messages associated with authentication and key establishment with the UE 215-*c* (for example, authenticating the identity of the UEs 215 and providing keys for secure communications such as keys for an encryption scheme of the sidelink communications). The UE 215-*a* may transmit a connection request response message based on the connection request message, the authentication and key establishment, or both (for example, a PC5-S connection request response as part of the inter-UE scheduling procedure). The UE 215-*c* and the UE 215-*a* may exchange one or more capability messages (for example, PC5-RRC messages indicating capability information, such as one or more capabilities of each UE 215), one or more configuration messages (for example, PC5-RRC AS-layer configuration messages), or any combination thereof. The UE 215-*c* may establish an RRC connection to the scheduling UE 215-*a*. In some examples, the UE 215-*c* may select the UE 215-*a* for establishing such a connection based on a pre-configuration, an announcement from other devices in the system, a zone identifier (ID), or any combination thereof, among other examples of parameters (for example, reference signal received power (RSRP), data load, among other examples). In some examples, establishing the sidelink connection may include or be an example of a sidelink random access channel (RACH) procedure.

The wireless communications system 200 may implement inter-UE coordination. For example, the UE 215-*a* may send coordination information to the UE 215-*c*, and the UE 215-*c* may transmit a sidelink transmission using the coordination information. In some examples, the inter-UE coordination may correspond to a first scheme (for example, the coordination information may include preferred resources, non-preferred resources, or both for the transmission), a second scheme (for example, the coordination information may indicate past or future conflicts), or a combination thereof. The UE 215-a may select preferred resources (for example, generate a preferred resource set) based on one or more parameters, such as a priority, a quantity of sub-channels, a reservation period provided by the UE 215-c, or any combination thereof. Additionally or alternatively, the UE 215-a may select non-preferred resources based on the resources overlapping with resources reserved by other UEs (for example, resources associated with a RSRP that satisfies a threshold), a half-duplex capability of the UE 215-c (for example, the resource is in a slot that is not configured for full duplex communications at the UE 215-c), or a combination thereof.

In some examples, the UE 215-c may select resources for the transmission or a retransmission based on sensing results (for example, sensing indicated resources), the coordination information, or a combination thereof. In some examples, selecting the resources may be based on whether the UE 215-c has a sensing capability, no sensing capability, or a partial (for example, reduced) sensing capability (for example, a reduced sensing UE 215). In some examples, the UE 215-a may determine the resources that the UE 215-c may use. Additionally or alternatively, the UE 215-c may select resources from the preferred resources set (for example, the UE 215-c may select the resources randomly or based on one or more parameters).

In some examples, the wireless communications system 200 may support request to send (RTS) and clear to send (CTS) operations. For example, in such operations, any node may initiate a transmission by transmitting an RTS message. The initiating node may receive a CTS message and transmit data based on receiving the CTS message. In some examples, the receiving node may transmit feedback (for example, an acknowledgement or negative acknowledgement) for the data. In some examples, the RTS and CTS operations may implement different aspects than inter-UE scheduling techniques. For example, with inter-UE scheduling, the receiving device may initiate data transmission by sending inter-UE scheduling information prior to receiving the data. Additionally or alternatively, the receiving device (for example, UE 215-a) may contend or sense resources for the transmission, inform other nodes of the transmission, or both, which may be different than RTS and CTS operations, in which the transmitting device may contend for or sense resources, inform other nodes, or both, though any combination of inter-UE scheduling and RTS and CTS operations may be implemented by the wireless communications system 200.

The wireless communications system 200 may support one or more schemes for inter-UE sidelink scheduling and communications. For example, the UE 215-c may transmit an indication to the UE 215-a that the UE 215-c has data for transmission (for example, data for transmission to one or more UEs 215, such as the UE 215-a). The UE 215-a may select a first set of resources for communication of the data. The UE 215-a may indicate the selected first set of resources to at least the UE 215-c. The UE 215-c may transmit the data via at least a portion of the first set of resources based on the one or more schemes for inter-UE sidelink scheduling.

For example, in a first scheme, the UE 215-a may broadcast inter-UE scheduling information to one or more UEs 215. That is, the UE 215-a may broadcast or groupcast an indication of the resources that are allocated to the UE 215-c to other UEs 215 (for example, the UE 215-b). By broadcasting such scheduling information to transmitting devices around the receiver, interference in the system may be reduced. For example, a wireless device with plans to transmit may avoid transmitting on the indicated resources, which may improve the communications reliability at the receiver.

In a second scheme, the UE 215-c may perform an LBT procedure prior to transmitting the data on the indicated first set of resources. For example, the UE 215-c may receive an indication of the allocated first set of resources. The UE 215-c may measure an energy associated with the resources. The UE 215-c may compare the energy measurement to a threshold. Based on a result of the comparing indicating that the threshold is satisfied, the UE 215-c may refrain from transmitting on the resources, which may reduce interference for a transmission at another UE 215 (for example, the transmission at the other UE 215 may be associated with the energy measurement satisfying the threshold). In such examples, the UE 215-c may indicate the failed LBT to the UE 215-a, and the UE 215-a may select a different set of resources for the transmission. In examples in which the threshold is not satisfied (for example, the energy is less than the threshold), the UE 215-c may transmit the data on the resources.

In a third scheme, the wireless communications system 200 may implement both inter-UE coordination and inter-UE scheduling. For example, the UE 215-a may communicate coordination information with other UEs 215 in the system to avoid scheduling the transmission for the UE 215-c on resources reserved by the other UEs 215. As an illustrative example, the UE 215-a may maintain a resource map indicating which resources are reserved by other UEs 215. The UE 215-a may update the resource map upon receiving sidelink control information indicating an allocation for another UE 215. In some examples, the UE 215-a may unicast a resource allocation (for example, an indication of the first set of resources, which may be a subset of the available resources in the resource map) to the UE 215-c. The UE 215-a may indicate the resource allocation to the other UEs 215 in the system such that another UE 215 may update a respective resource map.

In a fourth scheme, the UE 215-c may be configured to perform partial sensing. Partial sensing may be an example of sensing for a portion of resources or sensing done by a portion of devices. For example, the UE 215-a may select a set of resources for transmission of the data, and indicate the set of resources to the UE 215-c. The UE 215-c may perform partial sensing on the set of resources rather than all of the resources in a band that are different than the indicated set of resources. The UE 215-c may select a subset of the set of resources for transmission of the data based on the partial sensing.

Although described as separate schemes for illustrative clarity, it is to be understood that the wireless communications system 200 may implement any quantity and combination of the schemes. For example, the wireless communications system 200 may implement the first scheme and the second scheme (for example, the UE 215-c may perform an LBT procedure and the UE 215-a may broadcast the indication of the allocated resources), the first scheme and the third scheme (for example, the UEs 215 may broadcast allocated resources and coordinate other scheduling information), or any number or combination of schemes. In some examples, UEs 215 may implement schemes based on a capability of the devices. For example, in examples in which the UE 215-c does not have sensing capabilities, the UE 215-c and the UE 215 may implement the first scheme, the second scheme, the third scheme, or any combination thereof. In examples in which the UE 215-*c* has partial sensing capabilities, the UE 215-*c* may implement the fourth scheme and perform partial sensing (for example, the UE 215-*c* may sense the indicated first set of resources and select a subset of the resources for the data transmission based on the sensing).

By implementing one or more of the schemes described herein, the UE 215-*a* may be enabled to schedule the UE 215-*c* while mitigating interference in the system, sense on behalf of the UE 215-*c*, or both. Additionally or alternatively, the UE 215-*c* may be enabled to avoid interference with ongoing transmissions at other UEs 215 (for example, based on a result of the LBT procedure) upon receiving scheduling info, other UEs 215 may be able to identify the upcoming transmission by the UE 215-*c*, or a combination thereof.

Figure 3:
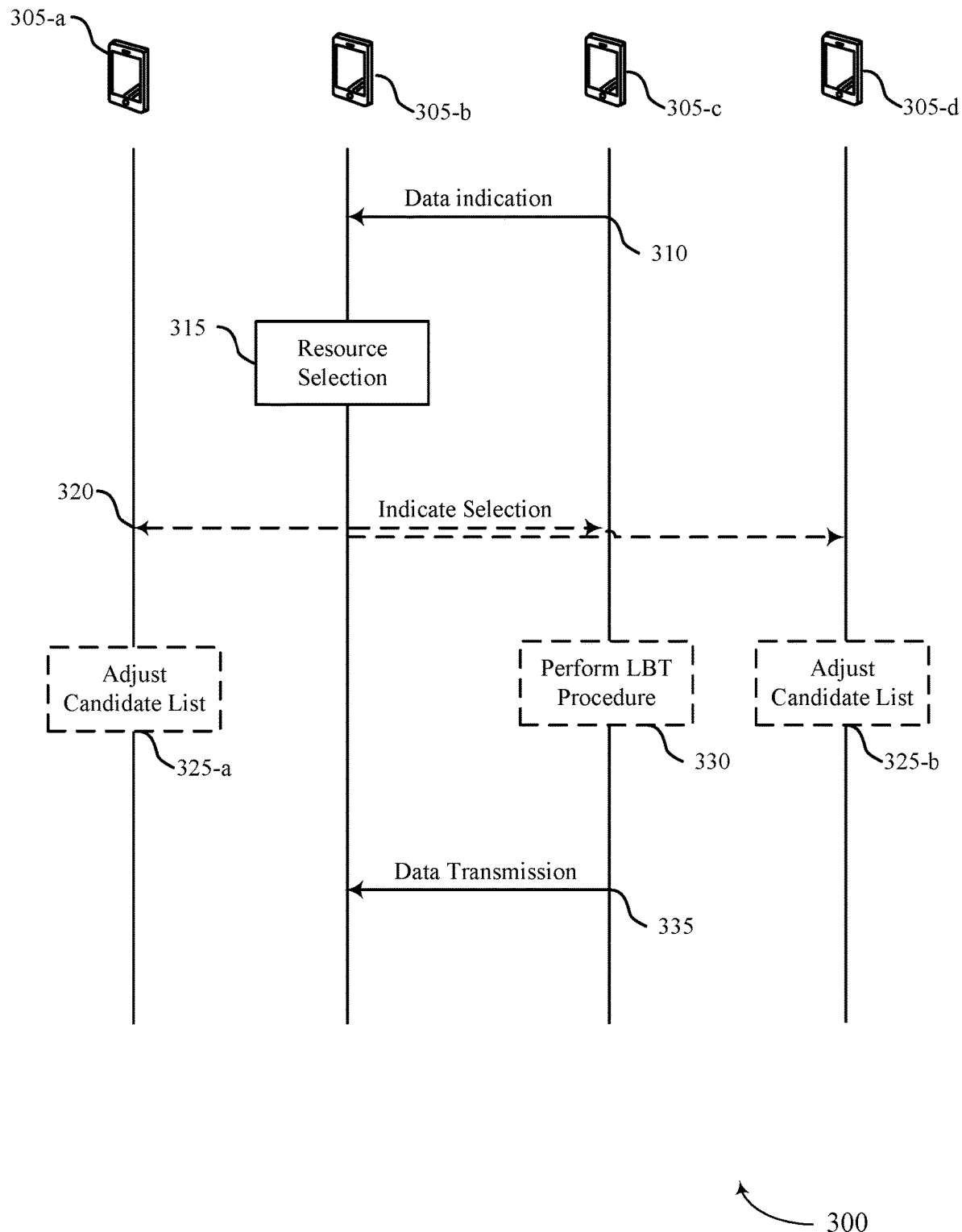
FIG. 3 illustrates an example of a process flow that supports inter-UE scheduling for sidelink communications in accordance with one or more aspects of the present disclosure.

FIG. 3 illustrates an example of a process flow 300 that supports inter-UE scheduling for sidelink communications in accordance with one or more aspects of the present disclosure. The process flow 300 may implement various aspects of the present disclosure as described with reference to FIGS. 1 and 2. For example, the process flow 300 may include a UE 305-*a*, a UE 305-*b*, a UE 305-*c*, and a UE 305-*d*, which may be examples of UEs 115 and 215 as described with reference to FIGS. 1 and 2. The process flow 300 may illustrate an example of one or more schemes for sidelink scheduling as described with reference to FIG. 2.

In the following description of the process flow 300, the operations between the UEs 305 may be performed in different orders or at different times. Some operations may also be left out of the process flow 300, or other operations may be added. Although the UEs 305 are shown performing the operations of the process flow 300, some aspects of some operations may additionally or alternatively be performed by one or more other wireless devices.

In some examples, the UE 305-*a*, the UE 305-*b*, and the UE 305-*d* may be examples of UEs with a first type (for example, "UE-As" such as the UE 215-*a*) and the UE 305-*c* may be an example of a UE with a second type (for example, "UE-B" such as the UE 215-*c*) as described with reference to FIG. 2, though it is to be understood that any UE 305 may be an example of either type of UE.

At 310, the UE 305-*c* may transmit (for example, output, send) a data indication to the UE 305-*b*. The data indication may indicate that the UE 305-*c* has data for transmission to one or more UEs 305 (for example, the UE 305-*b*). As an illustrative example, the data indication may be included in an assistance request message (for example, a "scheduling request (SR)/buffer status report (BSR)/UE assistanceinfo" message).

At 315, the UE 305-*b* may perform resource selection based on receiving the data indication. In some examples, the UE 305-*b* may select resources for the UE 305-*c* to use for transmitting the data. Stated alternatively, the UE 305-*b* may allocate a first set of resources for the UE 305-*c*. In some examples, the UE 305-*b* may select resources for transmitting scheduling information. For example, the UE 305-*b* may select resources for transmitting an indication that the first set of resources are allocated to the UE 305-*c*.

Additionally or alternatively, the UE 305-*b* may select resources from available resources of a selection window (for example, the UE 305-*b* may maintain a resource map of available resources and select a portion of the available resources). For example, the UE 305-*b* may be configured with a third scheme as described with reference to FIG. 2. In such examples, the UE 305-*b* may implement both inter-UE coordination and inter-UE scheduling. In inter-UE coordination, the UE 305-*b* may receive communications from other UEs 305 (for example, the UE 505-*a* and the UE 505-*d*) indicating resource reservations. The UE 305-*b* may adjust a resource map (for example, a selection window, a candidate list) to exclude the reserved resources from selection for the data transmission for the UE 305-*c*.

At 320, the UE 305-*b* may indicate the selected resources to one or more UEs 305. For example, the UE 305-*b* may be configured with a first scheme and the UE 305-*b* may broadcast the selected resources for the data of the UE 305-*c* (for example, the UE 305-*b* may use the resources selected for indicating the resource assignment to broadcast the indication). In such an example, the UE 305-*b* may broadcast or groupcast the resource selection (for example, the resource assignment, the resource allocation) to UEs 305 with a same type (for example, scheduling UE-As), other UEs 305 in the system, or a combination thereof.

In some examples, the indication of the selected resources at 320 may be included in a control message (for example, the format of the inter-UE scheduling signal may be a L2 broadcast MAC control element (CE) message format). For example, the UE 305-*b* may transmit sidelink control information (SCI), such as SCI2, indicating a broadcast to multiple nodes in the vicinity. Additionally or alternatively, the UE 3305-*b* may groupcast to nodes with a same type (for example, UE-As) that have a capability to listen (for example, perform sensing) as they are examples of scheduling UEs. In some examples, one or more MAC-CEs may be carried in the payload indicating assignments for each of the transmitting UEs 305 (for example, UE-Bs) that are requesting resources for transmission. In some examples, such MAC-CEs may convey scheduling information to the transmitting UEs 305 in addition or alternative to informing scheduling UEs 305 of the reserved resources for reception at the scheduling UEs 305. Such fields may enable the devices to avoid reserving or scheduling the reserved resources (for example, the indicated resources in the fields may act as "non-preferred resource lists" for neighboring UEs 305). As an example of a scheduling MAC-CE, an SCI signal may include one or more source indices and associated reserved resources, one or more resource reservation intervals (RRIs), or a combination thereof.

At 325-*a*, the UE 305-*a* may adjust a candidate list at the UE 305-*a*. For example, the UE 305-*a* may exclude the indicated resources from a resource map (for example, selection window) of available resources based on receiving the indication at 320. Stated alternatively, the UE 305-*a* may exclude the resources for the data transmission from a candidate list after decoding a grant allocation from the UE 305-*b* (for example, the indication of the selection at 320 may be an example of a grant allocation). At 325-*b*, the UE 305-*d* may adjust a candidate list at the UE 305-*d*. For example, the UE 305-*d* may exclude the indicated resources from a resource map (for example, selection window) of available resources based on receiving the indication at 320. Stated alternatively, the UE 305-*d* may exclude the resources for the data transmission from a candidate list after decoding a grant allocation from the UE 305-*b*.

In some examples, the UE 305-*a*, the UE 305-*b*, and the UE 305-*d* may adjust such candidate lists in accordance with a third scheme as described with reference to FIG. 2 (for example, combining inter-UE coordination and inter-UE scheduling). For example, the UE 305-*b* may reserve a set of resources that it intends to use for UE-Bs with a connection established with the UE 305-*b*. The UE 305-*b* may inform other UE-As (for example, the UE 305-*a* and the UE 305-*d*)

of the reserved resources. In some examples, the UE 305-*c* may forward or relay an indication of such resources to other UEs, such as the UE 305-*d* that may be out of range of the UE 305-*b*, which may extend a coverage of the resource reservations. Likewise, the UE 305-*a* and the UE 305-*d* may send indications of their respective reserved resources to the UE 305-*b*. At 315, the UE 305-*b* may select the resources for the data transmission of the UE 305-*c* from a selection window including the resources reserved for the UE 305-*b* to communicate with transmitting devices connected to the UE 305-*b*.

In some examples, such inter-UE coordination signaling (for example, signaling indicating the set of resources reserved for use by the UE 305-*b* for connected UEs 305, the subset of the set of resources reserved for the data transmission of the UE 305-*c*, or both) may be an example of a broadcast or groupcast MAC-CE. For example, the UEs 305-*a*, 305-*b*, and 305-*d* may each perform a round of sensing and reservation prior to broadcasting the reservation via MAC-CE along with an RRI to indicate the duration of the resource reservation. The UEs 305 may decode such a MAC-CE and refrain from using those reserved resources for the RRI. Additionally or alternatively, the signaling may include unicast MAC-CE or RRC signaling between pairs of UEs 305 with the first type (for example, UE-As). Additionally or alternatively, the reservations may be made via SCI reservation message, such as an SCI2 message modified to carry inter-UE scheduling information by reversing source and destination ID fields, an SCI1 message content that indicates or sets physical layer parameters, or both. In some examples, a MAC-CE message may be used in addition to such SCI messages. Additionally or alternatively, the signaling may be an example of RRC signaling, which may be suitable for periodic reservations and inter-UE scheduling, as an example. In some examples, the UEs may save a resource reservation state based on such signaling and poll surrounding UEs 305 for their respective resource reservation states. The UEs 305 may update their own resource reservation states using the polled states. Stated alternatively, one or more of the UEs 305 may maintain a reservation table.

At 330, the UE 305-*c* may perform an LBT procedure (for example, the UE 305-*c* may be configured with a second scheme as described with reference to FIG. 2). The UE 305-*c* may receive the indication of the selected resources (for example, the first set of resources) and perform the LBT procedure on the selected resources. The UE 305-*c* may obtain a result from the LBT procedure and determine whether to transmit the data transmission based on the result. In some examples, the UE 305-*c* may obtain a successful result. For example, a measurement associated with the resources may fail to satisfy a threshold. The UE 305-*c* may transmit the data transmission on the selected resources based on the successful result. In some other examples, the UE 305-*c* may obtain an unsuccessful result (such as, the LBT procedure may fail). For example, the measurement associated with the resources may satisfy a threshold. The UE 305-*c* may refrain from transmitting the data transmission based on the unsuccessful result. In some examples, the UE 305-*c* may trigger an LBT failure procedure based on the result. For example, the UE 305-*c* may indicate that the LBT procedure failed (for example, due to the resources being occupied by another UE 305) to the scheduling UE (for example, the UE 305-*b*). In some examples, the indication of the LBT failure may be included in a control message (for example, a medium access control (MAC) message). The UE 305-*c* may receive a new resource allocation, an indication to attempt the LBT procedure and data transmission at a later time, or both, in response to the indication that the LBT procedure failed (for example, that the resources were occupied).

In some examples, the LBT procedure may be associated with a sub band. That is, in addition or alternative to a blind LBT procedure (for example, LBT failure being declared in examples in which an energy measurement satisfies a threshold over a whole band), the UE 305-*c* may obtain an energy measurement for the sub band or subchannel associated with the indicated resources. In some examples, the UE 305-*c* may apply baseband processing. For example, the UE 305-*c* may obtain an energy metric and apply such processing to measure the energy that corresponds to the sub band. The UE 305-*c* may perform an LBT procedure for one or more (for example, a single) subchannel or sub band and transmit the data or refrain from transmitting the data based on a result of the subchannel LBT procedure. In some examples, multiple UEs 305 may be configured to perform LBT prior to each transmission in the system.

In some examples, the UE 305-*c* may monitor for feedback from the UE 305-*d* as part of the LBT procedure. For example, another UE 305 may be an example of a UE 305 with a same type (for example, a transmitting UE-B) that is out of the range of the UE 305-*b*. The UE 305-*c* may avoid hidden terminal receiver interference (for example, collision of the data transmission from the UE 305-*c* and a data transmission from the UE 305-*d* to another hidden UE 305) by monitoring for feedback from the UE 305-*d* as part of the LBT procedure. As an illustrative example, the UE 305-*c* may perform sensing, an RTS and CTS handshake with the UE 305-*d*, detect feedback indicating an acknowledgement of a resource reservation from the hidden UE 305 (for example, the UE-A and UE-B transmissions may be synchronized by a pre-configuration), or any combination thereof, which may enable the UE 305-*c* to detect a transmission that may collide with the data transmission of the UE 305-*c*. The UE 305-*c* may refrain from transmitting due to the detection of the transmission (for example, even with a successful result of the LBT procedure) based on monitoring for such feedback.

By performing the LBT procedure, the UE 305-*c* may protect the UE 305-*d* from collisions with the UE 305-*c* due to the UE 305-*b* being outside of a range or otherwise unaware of the transmission at the UE 305-*d*.

At 335, the UE 305-*c* may transmit the data transmission. For example, the UE 305-*c* may transmit the data transmission on the allocated set of resources, or on a different set of resources allocated as a result of a failed LBT procedure. In some examples, the UE 305-*c* may transmit an indication of the allocated resources prior to transmitting the data. For example, the UE 305-*c* may transmit sidelink control information reserving the resources to UEs 305 in a range of the UE 305-*c*.

Figure 4:
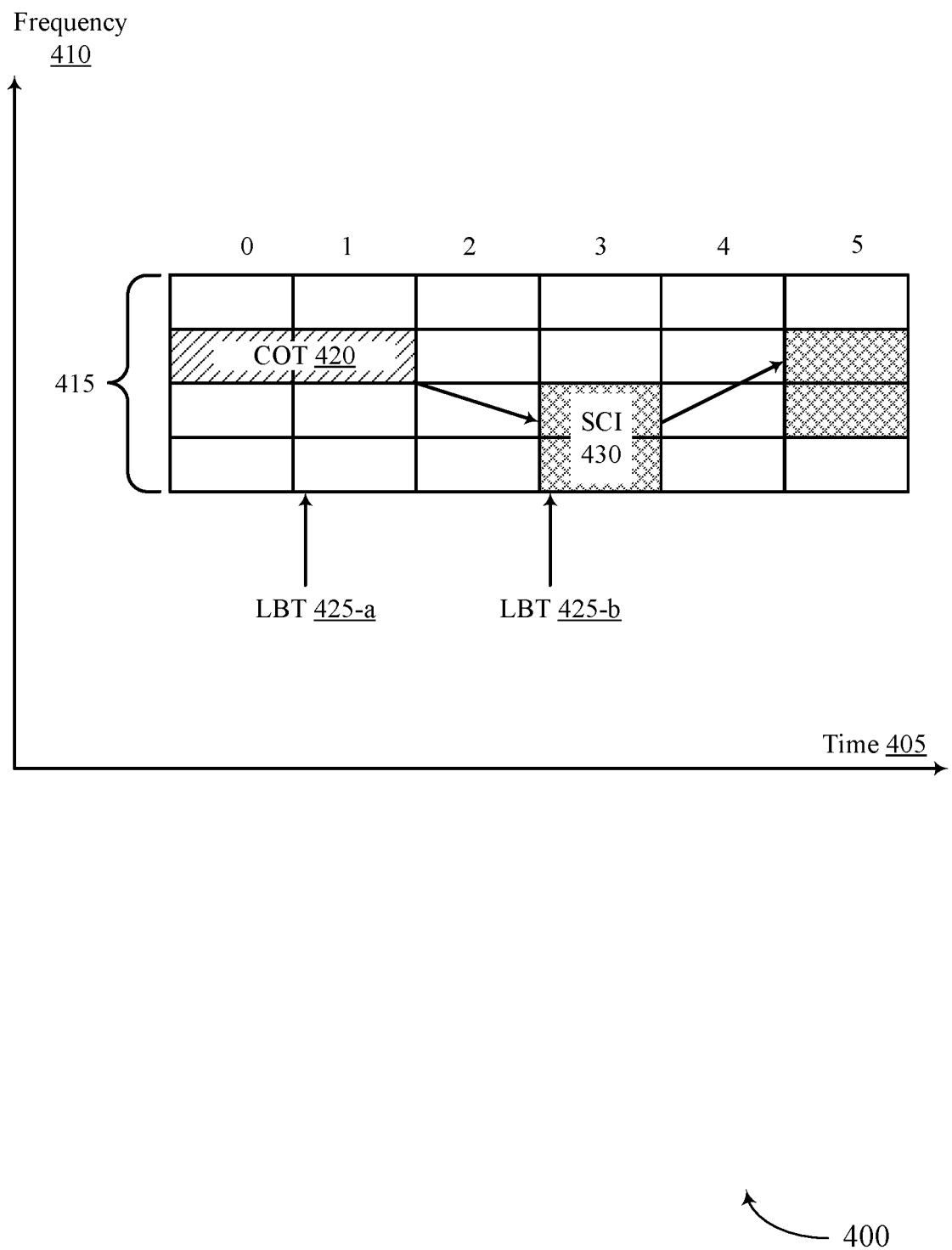
FIG. 4 illustrates an example of a resource scheme that supports inter-UE scheduling for sidelink communications in accordance with one or more aspects of the present disclosure.

FIG. 4 illustrates an example of a resource scheme 400 that supports inter-UE scheduling for sidelink communications in accordance with one or more aspects of the present disclosure. In some examples, the resource scheme 400 may represent a scheme used by a UE 115 to perform one or more LBT procedures for transmission of data as described with reference to FIGS. 1-3.

The resource scheme 400 may include a band 415 of resources on an axis of time 405 and frequency 410. A first device (for example, a UE 115) may receive an indication of resources at slot 1 for a data transmission as described with reference to FIGS. 1-3. In accordance with a second scheme as described with reference to FIG. 2, the first device may perform LBT 425-*a* prior to transmitting the data. In the example of the resource scheme 400, the first device may determine that an energy of the reserved sub band or subchannel satisfies (for example, is greater than) a threshold due to another device transmitting over the channel occupancy time (COT) 420 on at least a portion of the reserved resources.

In such an example, the first device may obtain an LBT failure at the first scheduled resource in slot 1. The first device may refrain from transmitting the data transmission and initiate a feedback process. The first device may transmit hybrid automatic repeat request (HARQ) feedback or otherwise indicate the LBT failure or trigger a retransmission attempt based on the failure. The first device may receive an indication of second resources in slot 3 for the retransmission. The first device may perform LBT 425-*b* and obtain an LBT success at the second resources (for example, the energy of the measured sub band may fail to satisfy the threshold indicating that the channel is clear or unoccupied). The first device may transmit SCI 430 reserving the resources or the next resources at slot 5 or both. Additionally or alternatively, the first device may transmit the data transmission (for example, a transport block (TB)) at the second resources, the next resources, or both. In some examples, another device may decode the SCI 430 and exclude the resources (for example, in examples in which the transmission associated with the SCI 430 falls within a sensing window of the other device). Such techniques may reduce the occurrence or probability of collisions of transmissions within the system, among other benefits.

Figure 5:
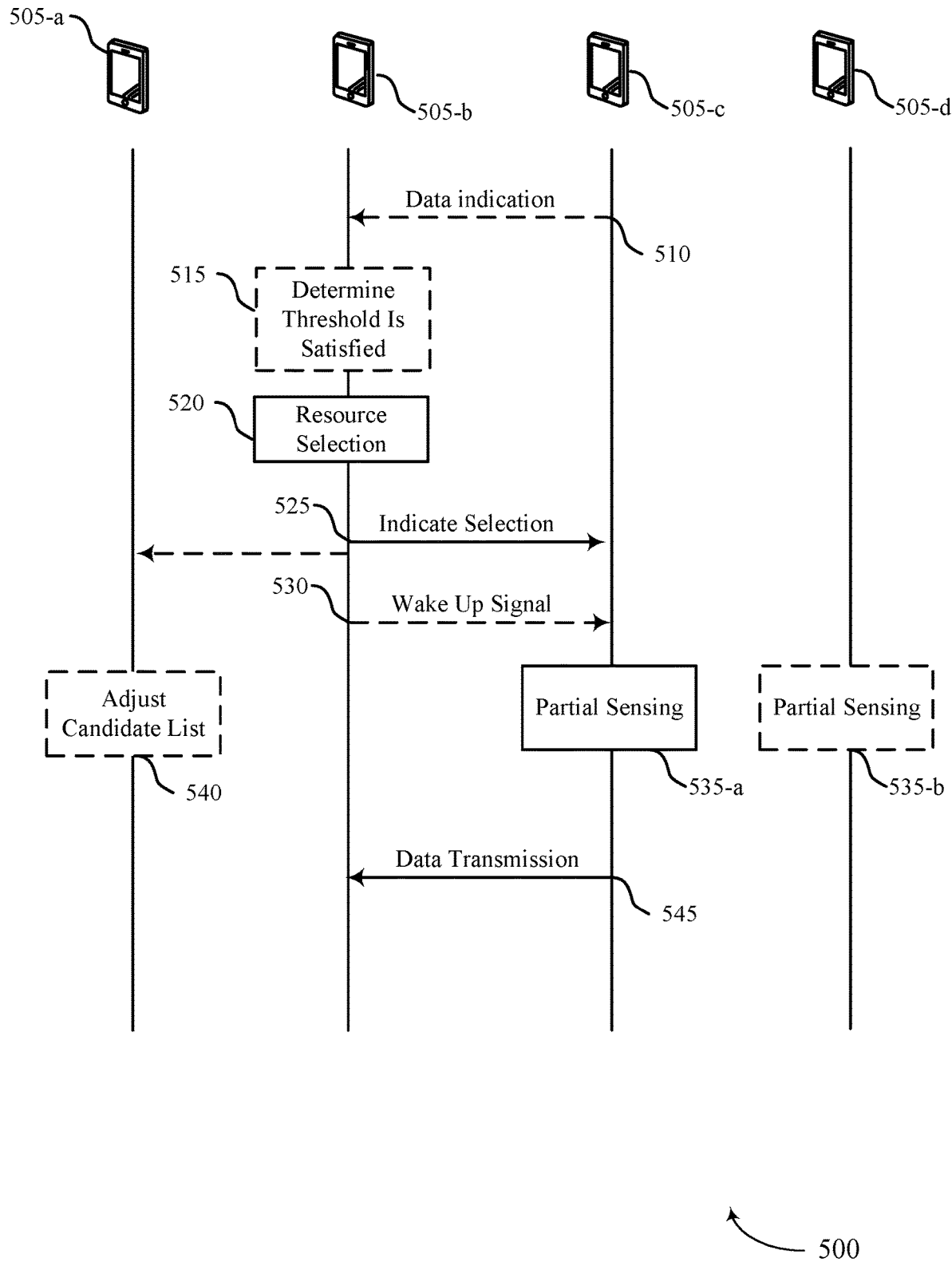
FIGS. 5-7 illustrate examples of process flows that support inter-UE scheduling for sidelink communications in accordance with one or more aspects of the present disclosure.

FIG. 5 illustrates an example of a process flow 500 that supports inter-UE scheduling for sidelink communications in accordance with one or more aspects of the present disclosure. The process flow 500 may implement various aspects of the present disclosure as described with reference to FIGS. 1-4. For example, the process flow 500 may include a UE 505-*a*, a UE 505-*b*, a UE 505-*c*, and a UE 505-*d*, which may be examples of UEs 115 and 215 as described with reference to FIGS. 1 and 2. The process flow 300 may illustrate an example of a fourth scheme as described with reference to FIG. 2.

In the following description of the process flow 500, the operations between the UEs 505 may be performed in different orders or at different times. Some operations may also be left out of the process flow 500, or other operations may be added. Although the UEs 505 are shown performing the operations of the process flow 500, some aspects of some operations may additionally or alternatively be performed by one or more other wireless devices. Further, aspects of the various process flows in this disclosure may additionally or alternatively be implemented by other process flows.

In some examples, the UE 505-*a*, the UE 505-*b*, and the UE 505-*d* may be examples of UEs with a first type (for example, "UE-As" such as the UE 215-*a*) and the UE 505-*c* may be an example of a UE with a second type (for example, "UE-B" such as the UE 215-*c*) as described with reference to FIG. 2, though it is to be understood that any UE 505 may be an example of either type of UE.

At 510, the UE 305-*c* may transmit a data indication to the UE 505-*b*. The data indication may indicate that the UE 505-*c* has data for transmission to one or more UEs 505 (for example, the UE 505-*b*). As an illustrative example, the data indication may be included in an assistance request message (for example, a "scheduling request (SR)/buffer status report (BSR)/UE assistanceinfo" message).

At 515, the UE 505-*b* may determine whether a threshold is satisfied based on receiving the data indication. For example, the UE 505-*b* may determine if a condition for inter-UE coordination information is satisfied at the UE 505-*b* (for example, whether the UE 505-*b* is configured to support inter-UE coordination techniques).

At 520, the UE 505-*b* may perform resource selection as described with reference to FIG. 3. For example, the UE 505-*b* may perform sensing and select resources for the UE 305-*c* to use for transmitting the data based on the sensing. Stated alternatively, the UE 305-*b* may allocate a first set of resources for the UE 305-*c*. In some examples, the UE 305-*b* may select resources for transmitting scheduling information. For example, the UE 305-*b* may select resources (for example, resources "A") for transmitting an indication that the first set of resources are allocated to the UE 305-*c* (for example, resources "B").

At 525, the UE 505-*b* may indicate the selection of the resources. For example, the UE 505-*b* may transmit the indication over resources "A" that the resources "B" are allocated to the UE 505-*c*. In some examples, such an indication may be broadcast to other UEs 505 in addition to the UE 505-*c*. For example, at 540 the UE 505-*a* may exclude the resources from available resources or includes them in a "non-preferred" candidate list.

At 530, the UE 505-*b* may transmit a wake up signal to the UE 505-*c*. For example, the UE 505-*b* may transmit an indication to wake-up to perform sensing to the UE 505-*c* based on a capability of the UE 505-*c* to support partial sensing as described with reference to FIG. 2.

At 535-*a*, the UE 505-*c* may perform partial sensing. For example, the UE 505-*c* may sense the resources indicated at 525. The UE 505-*c* may select a subset of the resources for communicating the data transmission based on results of the partial sensing. For example, the UE 505-*c* may remove resources which are busy (for example, resources in the allocated first set of resources that have an energy metric or another metric indicating that they are occupied, such as an indication of reserved resources via SCI from other UEs 505) and select at least a portion of the remaining resources for data transmission. In some examples, at 535-*b*, the UE 505-*d* may perform partial sensing in addition or alternative to other UEs 505 performing partial sensing.

At 545, the UE 505-*c* may transmit the data transmission over the subset of resources selected from the allocated first set of resources. For example, the UE 505-*c* may transmit SCI and corresponding data (for example, a TB) over the resources based on the resources being identified as available from the sensing procedure at 535.

In some examples, the UE 505-*c* may use a different partial sensing window from the sensing window that the UE 505-*b* uses to select the first set of resources. For example, at a first time the UE 505-*b* may perform sensing to select a set of resources for sensing at the UE 505-*c*. At a second time the UE 505-*c* may receive the inter-scheduling message (for example, the selection indication at 525) and perform the partial sensing based on receiving the message. At a third time the UE 505-*c* may select a subset of resources for transmission of the data from the set of resources indicated by the UE 505-*b* based on the partial sensing.

Additionally or alternatively, the UE 505-*c* may perform a re-evaluation operation. For example, at a first time the UE 505-*b* may sense resources over a window. After indicating the first set of resources to the UE 505-*c* based on the sensing, the UE 505-*c* may perform a reevaluation operation (for example, the UE 505-*c* may sense all of the resources to double check the resources that are available from the entire window). In some examples, the UE 505-*c* may transmit its own SCI to clear the resources in its vicinity in addition or alternative to the SCI of the UE 505-*b* indicating that the resources are allocated to the UE 505-*c*.

In some examples, the UE 505-*c* may determine that the scheduled resources are not available based on an unsuccessful result of the partial or full sensing. In such examples, the UE 505-*c* may transmit a collision report to initiate a rescheduling of resources for the data transmission.

Figure 6:
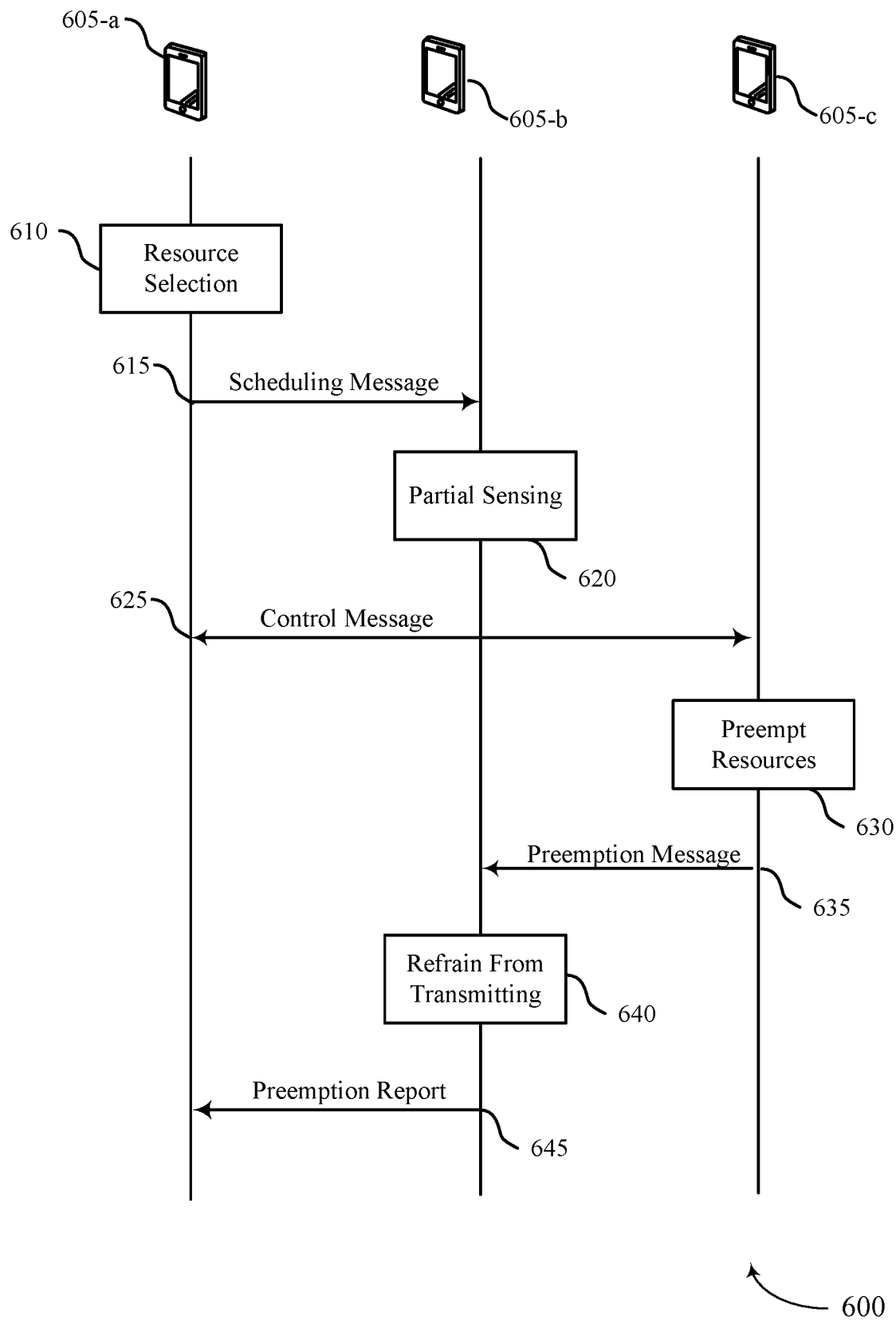

FIG. 6 illustrates an example of a process flow 600 that supports inter-UE scheduling for sidelink communications in accordance with one or more aspects of the present disclosure. The process flow 600 may implement various aspects of the present disclosure as described with reference to FIGS. 1-5. For example, the process flow 600 may include a UE 605-*a*, a UE 605-*b*, and a UE 605-*c*, which may be examples of UEs 115 and 215 as described with reference to FIGS. 1 and 2. The process flow 600 may illustrate an example of preemption scheme.

In the following description of the process flow 600, the operations between the UEs 605 may be performed in different orders or at different times. Some operations may also be left out of the process flow 600, or other operations may be added. Although the UEs 605 are shown performing the operations of the process flow 600, some aspects of some operations may additionally or alternatively be performed by one or more other wireless devices. Further, aspects of the various process flows in this disclosure may additionally or alternatively be implemented by other process flows.

At 610, the UE 605-*a* may perform resource selection as described with reference to FIGS. 3 and 5. At 615, the UE 605-*a* may transmit a scheduling message to the UE 605-*b*. For example, the UE 605-*a* may transmit an indication that a first set of resources are allocated to the UE 605-*b*.

At 620, the UE 605-*b* may perform partial sensing as described with reference to FIG. 5. At 625, the UE 605-*b* may transmit a control message based on the partial sensing. For example, the UE 605-*b* may send SCI to reserve resources in the selection window used in the partial sensing. In some examples, the UE 605-*b* may broadcast the control message to both the UE 605-*a* and the UE 605-*c*.

At 630, the UE 605-*c* may preempt the resources reserved by the control message at 625. For example, the UE 605-*c* may receive traffic with a priority higher than the traffic associated with the data transmission of the UE 605-*b*. In such examples, the UE 605-*c* may preempt the resources for the higher priority traffic.

At 635, the UE 605-*c* may transmit a preemption message indicating that the resources are preempted for the higher priority traffic. For example, the UE 605-*c* may send SCI preempting the reserved resources.

At 640, the UE 605-*c* may refrain from transmitting on the preempted resources in response to receiving the preemption message. At 645, the UE 605-*b* may transmit a preemption report. For example, the UE 605-*b* may send a message indicating (for example, reporting) the preemption or collision to the UE 605-*a*. The UE 605-*a* may be triggered to restart the process flow 600 to obtain new resources for a retransmission of the data for the UE 605-*b*.

In some examples, the preemption techniques of the process flow 600 may enable prioritization among transmissions in the system along with inter-UE scheduling, partial sensing at the UE 605-*b*, or both.

Figure 7:
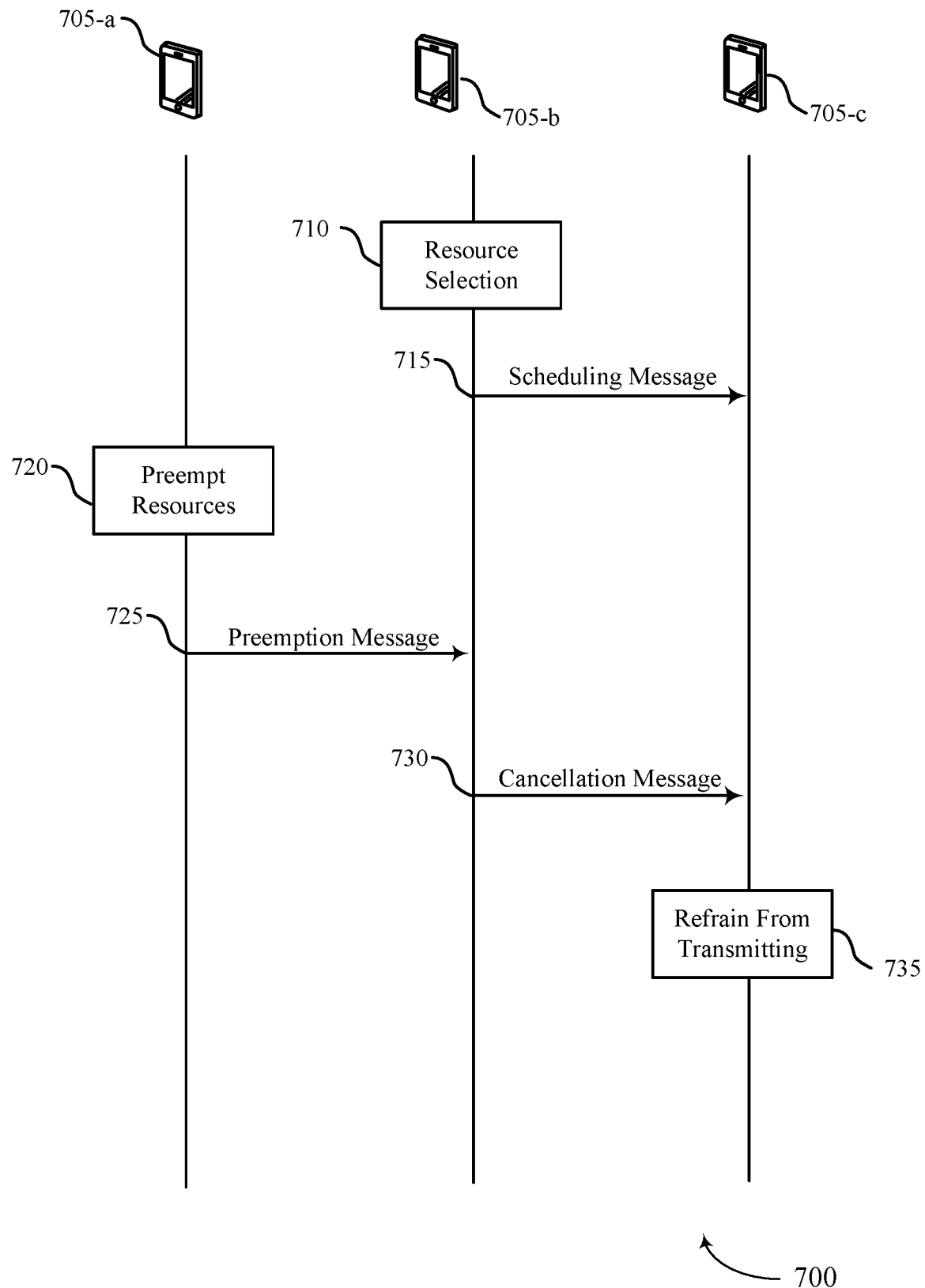

FIG. 7 illustrates an example of a process flow 700 that supports inter-UE scheduling for sidelink communications in accordance with one or more aspects of the present disclosure. The process flow 700 may implement various aspects of the present disclosure as described with reference to FIGS. 1-6. For example, the process flow 700 may include a UE 705-*a*, a UE 705-*b*, and a UE 705-*c*, which may be examples of UEs 115 and 215 as described with reference to FIGS. 1 and 2. The process flow 700 may illustrate an example a cancellation scheme.

In the following description of the process flow 700, the operations between the UEs 705 may be performed in different orders or at different times. Some operations may also be left out of the process flow 700, or other operations may be added. Although the UEs 705 are shown performing the operations of the process flow 700, some aspects of some operations may additionally or alternatively be performed by one or more other wireless devices. Further, aspects of the various process flows in this disclosure may additionally or alternatively be implemented by other process flows.

At 710, the UE 705-*b* may perform resource selection as described with reference to FIGS. 3 and 5. At 715, the UE 705-*b* may transmit a scheduling message to the UE 705-*c*. For example, the UE 705-*b* may transmit an indication that a first set of resources are allocated to the UE 705-*c*. The UE 705-*c* may prepare the transmit on the scheduled resources in response to receiving the indication of the first set of resources.

At 720, the UE 705-*a* may preempt the resources reserved by the control message at 715. For example, the UE 705-*a* may receive traffic with a priority higher than the traffic associated with the data transmission of the UE 705-*c*. In such examples, the UE 705-*a* may preempt the resources for the higher priority traffic.

At 725, the UE 705-*a* may transmit a preemption message indicating that the resources are preempted for the higher priority traffic. For example, the UE 705-*a* may send SCI preempting the reserved resources.

At 730, the UE 705-*b* may transmit a cancellation message in response to receiving the preemption message. At 735, the UE 705-*c* may refrain from transmitting on the canceled resources based on receiving the cancellation message.

In some examples, the cancellation message (for example, cancellation signal) may allow the UE 705-*b* to cancel previously scheduled resources to the UE 705-*c* in the event that the UE 705-*a* senses preemption of the scheduled resources by higher priority traffic of another transmitter UE (for example, a UE-B) connected to the UE 705-*a*. In some examples, the cancellation signal may be carried by SCI, MAC-CE, RRC signaling, or any combination thereof.

Figure 8:
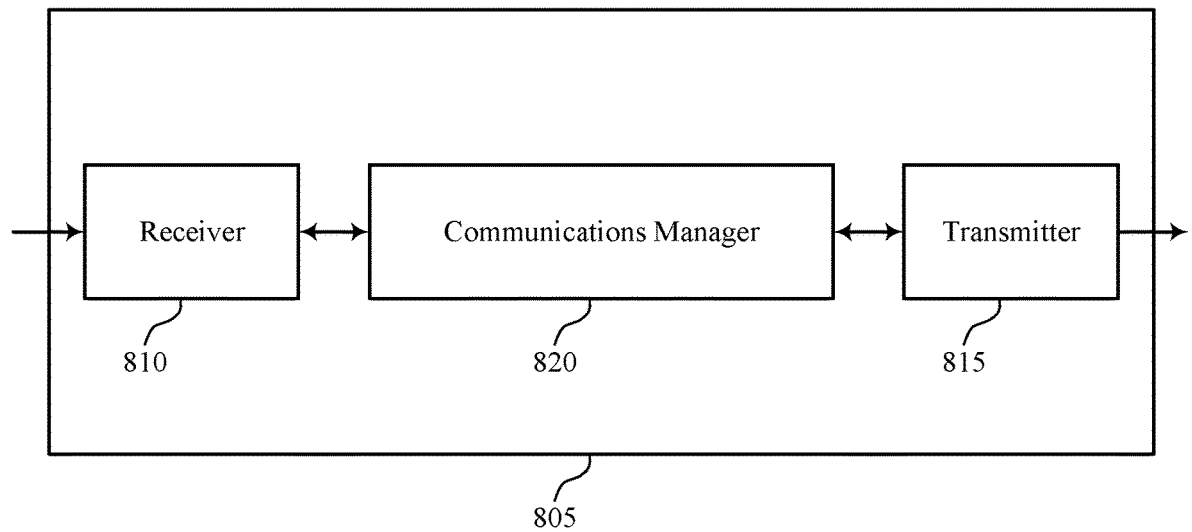
FIGS. 8 and 9 show block diagrams of devices that support inter-UE scheduling for sidelink communications in accordance with one or more aspects of the present disclosure.

FIG. 8 shows a block diagram of a device 805 that supports inter-UE scheduling for sidelink communications in accordance with one or more aspects of the present disclosure. The device 805 may be an example of aspects of a UE 115 as described herein. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to scheduling techniques for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to scheduling techniques for sidelink communications). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of scheduling techniques for sidelink communications. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (for example, in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 820 may be configured to perform various operations (for example, receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations.

The communications manager 820 may support wireless communications at a first UE in accordance with examples as disclosed herein. For example, the communications manager 820 may be configured as or otherwise support a means for communicating one or more messages associated with establishing a sidelink communication connection with each of a set of UEs. The communications manager 820 may be configured as or otherwise support a means for transmitting, to a second UE of the set of UEs based on communicating the one or more messages associated with establishing the sidelink communication connection, a message indicating that the first UE has a data transmission for one or more UEs of the set of UEs. The communications manager 820 may be configured as or otherwise support a means for receiving, from the second UE and broadcasted over a second set of resources, an indication that a first set of resources is allocated to the first UE for the data transmission. The communications manager 820 may be configured as or otherwise support a means for transmitting the data transmission over the first set of resources based on receiving the indication that the first set of resources is allocated to the first UE for the data transmission.

Additionally, or alternatively, the communications manager 820 may support wireless communications at a first UE in accordance with examples as disclosed herein. For example, the communications manager 820 may be configured as or otherwise support a means for communicating one or more messages associated with establishing a sidelink communication connection with each of a set of UEs. The communications manager 820 may be configured as or otherwise support a means for receiving, from a second UE of the set of UEs, a message indicating that the second UE has a data transmission for one or more UEs of the set of UEs based on communicating the one or more messages associated with establishing the sidelink communication connection. The communications manager 820 may be configured as or otherwise support a means for selecting a first set of resources for the data transmission based on receiving the message. The communications manager 820 may be configured as or otherwise support a means for broadcasting, to the set of UEs and over a second set of resources, an indication that the first set of resources being allocated to the second UE for the data transmission.

By including or configuring the communications manager 820 in accordance with examples, the device 805 (for example, a processor controlling or otherwise coupled with the receiver 810, the transmitter 815, the communications manager 820, or a combination thereof) may support techniques for sidelink inter-UE scheduling. For example, such techniques may enable the device 805 to avoid or reduce the likelihood of interference with communications in the system, which may result in reduced processing power, reduced power consumption, increased communications reliability and efficiency, or any combination thereof, among other examples of advantages at a modem or processor of the device 805.

Figure 9:
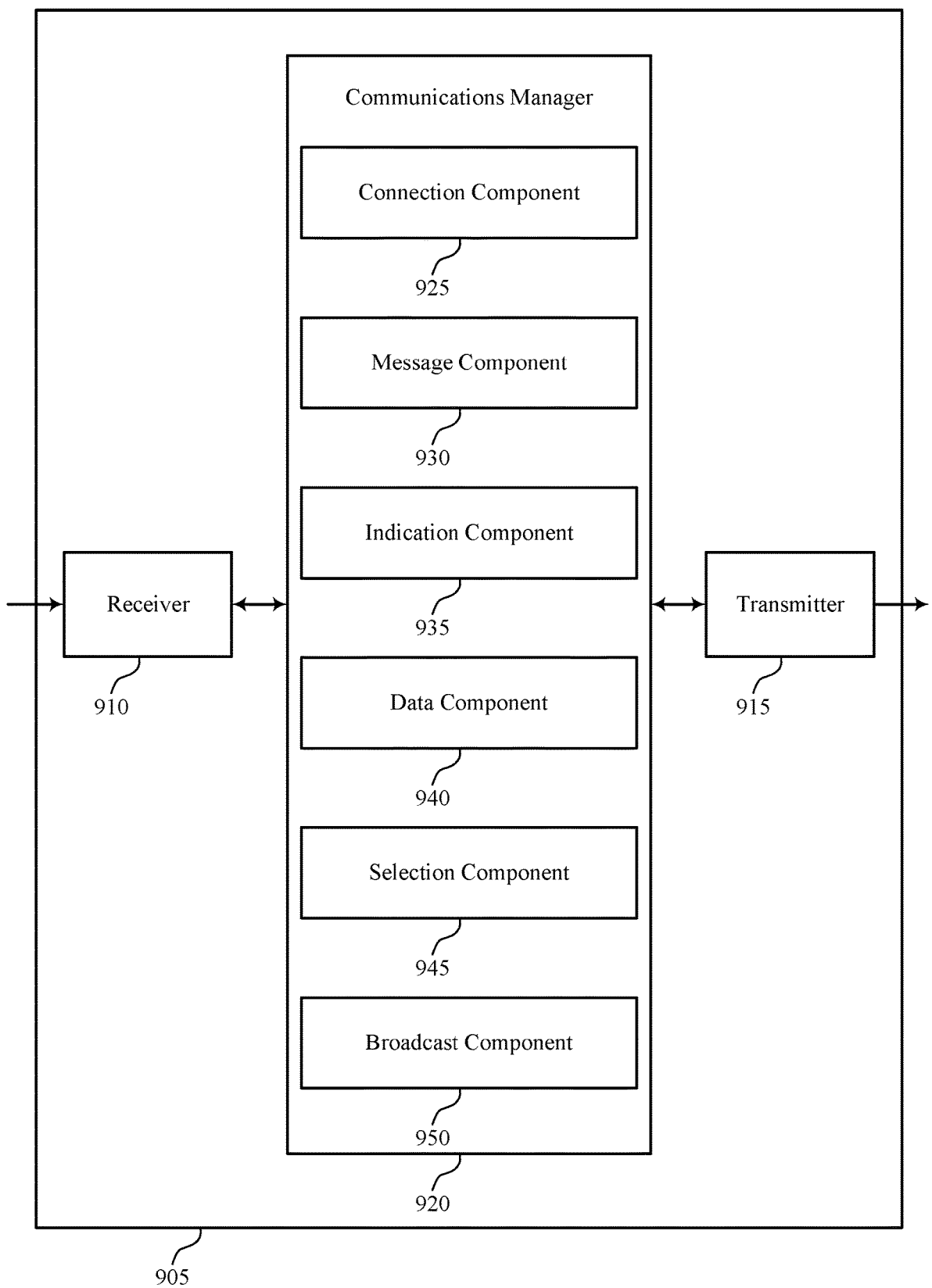

FIG. 9 shows a block diagram of a device 905 that supports inter-UE scheduling for sidelink communications in accordance with one or more aspects of the present disclosure. The device 905 may be an example of aspects of a device 805 or a UE 115. The device 905 may include a receiver 910, a transmitter 915, and a communications manager 920. The device 905 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to scheduling techniques for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to scheduling techniques for sidelink communications). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of scheduling techniques for sidelink communications. For example, the communications manager 920 may include a connection component 925, a message component 930, an indication component 935, a data component 940, a selection component 945, a broadcast component 950, or any combination thereof. In some examples, the communications manager 920, or various components thereof, may be configured to perform various operations (for example, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations.

The communications manager 920 may support wireless communications at a first UE in accordance with examples as disclosed herein. The connection component 925 may be configured as or otherwise support a means for communicating one or more messages associated with establishing a sidelink communication connection with each of a set of UEs. The message component 930 may be configured as or otherwise support a means for transmitting, to a second UE of the set of UEs based on communicating the one or more messages associated with establishing the sidelink communication connection, a message indicating that the first UE has a data transmission for one or more UEs of the set of UEs. The indication component 935 may be configured as or otherwise support a means for receiving, from the second UE and broadcasted over a second set of resources, an indication that a first set of resources is allocated to the first UE for the data transmission. The data component 940 may be configured as or otherwise support a means for transmitting the data transmission over the first set of resources based on receiving the indication that the first set of resources is allocated to the first UE for the data transmission.

Additionally, or alternatively, the communications manager 920 may support wireless communications at a first UE in accordance with examples as disclosed herein. The connection component 925 may be configured as or otherwise support a means for communicating one or more messages associated with establishing a sidelink communication connection with each of a set of UEs. The message component 930 may be configured as or otherwise support a means for receiving, from a second UE of the set of UEs, a message indicating that the second UE has a data transmission for one or more UEs of the set of UEs based on communicating the one or more messages associated with establishing the sidelink communication connection. The selection component 945 may be configured as or otherwise support a means for selecting a first set of resources for the data transmission based on receiving the message. The broadcast component 950 may be configured as or otherwise support a means for broadcasting, to the set of UEs and over a second set of resources, an indication that the first set of resources is allocated to the second UE for the data transmission.

Figure 10:
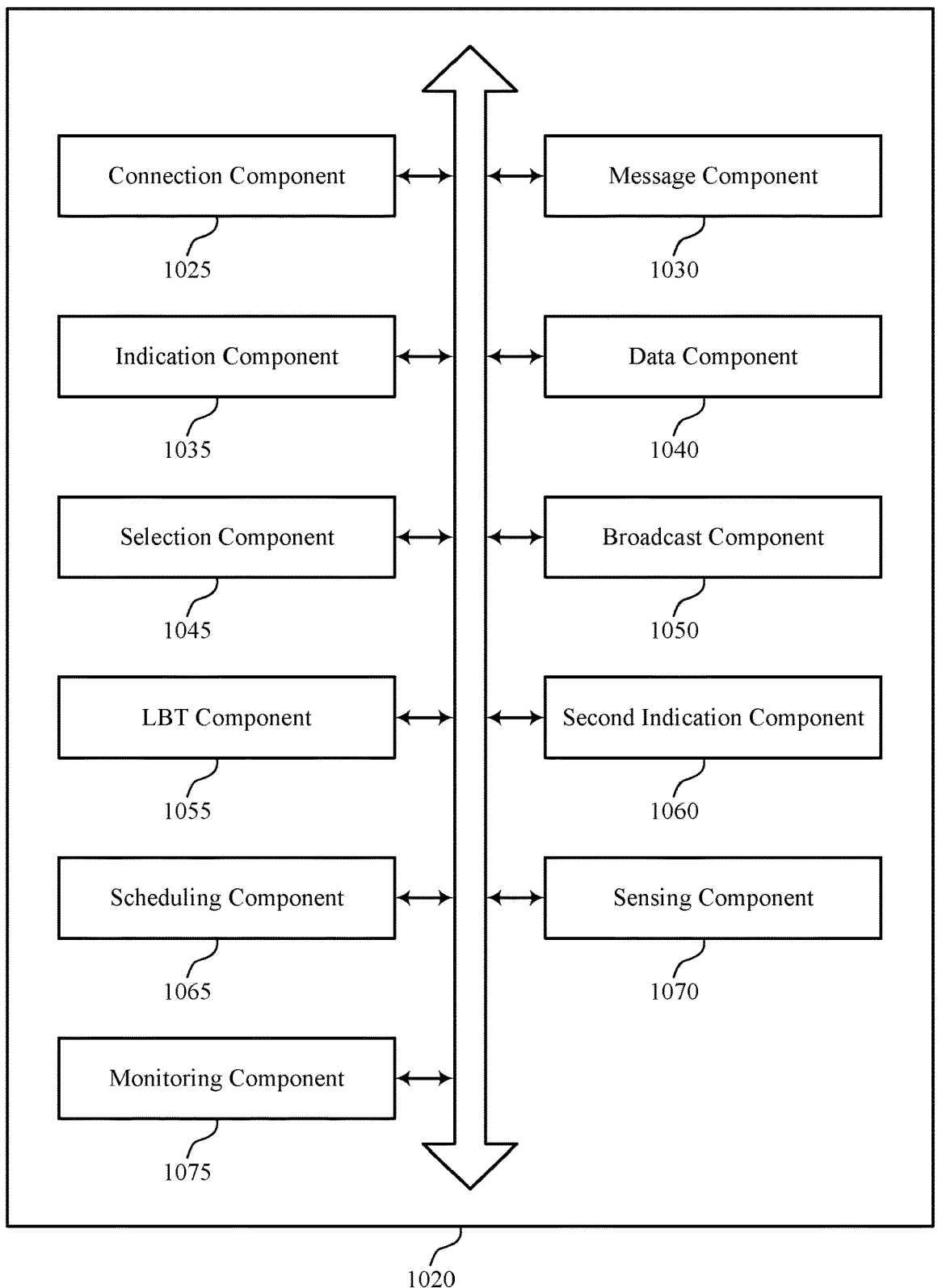
FIG. 10 shows a block diagram of a communications manager that supports inter-UE scheduling for sidelink communications in accordance with one or more aspects of the present disclosure.

FIG. 10 shows a block diagram of a communications manager 1020 that supports inter-UE scheduling for sidelink communications in accordance with one or more aspects of the present disclosure. The communications manager 1020, or various components thereof, may be an example of means for performing various aspects of scheduling techniques for sidelink communications. For example, the communications manager 1020 may include a connection component 1025, a message component 1030, an indication component 1035, a data component 1040, a selection component 1045, a broadcast component 1050, an LBT component 1055, a second indication component 1060, a scheduling component 1065, a sensing component 1070, a monitoring component 1075, or any combination thereof. Each of these components may communicate, directly or indirectly, with one another (for example, via one or more buses).

The communications manager 1020 may support wireless communications at a first UE in accordance with examples as disclosed herein. The connection component 1025 may be configured as or otherwise support a means for communicating one or more messages associated with establishing a sidelink communication connection with each of a set of UEs. The message component 1030 may be configured as or otherwise support a means for transmitting, to a second UE of the set of UEs based on communicating the one or more messages associated with establishing the sidelink communication connection, a message indicating that the first UE has a data transmission for one or more UEs of the set of UEs. The indication component 1035 may be configured as or otherwise support a means for receiving, from the second UE and broadcasted over a second set of resources, an indication that a first set of resources is allocated to the first UE for the data transmission. The data component 1040 may be configured as or otherwise support a means for transmitting the data transmission over the first set of resources based on receiving the indication that the first set of resources is allocated to the first UE for the data transmission.

In some examples, the LBT component 1055 may be configured as or otherwise support a means for performing a listen before talk procedure for the first set of resources, in which transmitting the data transmission over the first set of resources is based on a result of the listen before talk procedure.

In some examples, to support performing the listen before talk procedure, the LBT component 1055 may be configured as or otherwise support a means for determining an energy associated with a subchannel of a band. In some examples, to support performing the listen before talk procedure, the LBT component 1055 may be configured as or otherwise support a means for comparing the energy associated with the subchannel to a threshold. In some examples, to support performing the listen before talk procedure, the LBT component 1055 may be configured as or otherwise support a means for obtaining the result of the listen before talk procedure based on the comparison.

In some examples, to support performing the listen before talk procedure, the monitoring component 1075 may be configured as or otherwise support a means for monitoring for feedback from a third UE, in which transmitting the data transmission is based on monitoring for the feedback from the third UE.

In some examples, the second indication component 1060 may be configured as or otherwise support a means for transmitting, to at least a subset of the set of UEs, a second indication that the first set of resources is allocated to the first UE based on receiving the indication.

In some examples, the subset of the set of UEs includes UEs outside of a coverage area of the second UE.

In some examples, the scheduling component 1065 may be configured as or otherwise support a means for receiving scheduling information from the second UE in response to transmitting the message indicating that the first UE has the data transmission, the scheduling information indicating a subset of resources including at least the first set of resources. In some examples, the sensing component 1070 may be configured as or otherwise support a means for performing sensing on the subset of resources. In some examples, the selection component 1045 may be configured as or otherwise support a means for selecting the first set of resources from the subset of resources for the data transmission based on performing the sensing.

In some examples, the indication component 1035 may be configured as or otherwise support a means for receiving, from the second UE, an indication to perform the sensing, in which performing the sensing is based on receiving the indication to perform the sensing.

In some examples, the sensing component 1070 may be configured as or otherwise support a means for performing sensing on the first set of resources. In some examples, the second indication component 1060 may be configured as or otherwise support a means for transmitting, to the set of UEs based on performing the sensing on the first set of resources, a second indication that the first set of resources is allocated to the first UE, in which transmitting the data transmission is based on transmitting the second indication.

In some examples, the message component 1030 may be configured as or otherwise support a means for receiving, from a third UE, a second message indicating that a third set of resources are preempted by the third UE. In some examples, the data component 1040 may be configured as or otherwise support a means for refraining from transmitting on the third set of resources based on receiving the second message. In some examples, the message component 1030 may be configured as or otherwise support a means for transmitting a third message to the second UE indicating that the third set of resources is preempted, in which transmitting the message indicating that the first UE has the data transmission is based on the third message.

In some examples, the message component 1030 may be configured as or otherwise support a means for receiving, from the second UE, a second message indicating that a third set of resources is preempted based on a priority of another transmission. In some examples, the data component 1040 may be configured as or otherwise support a means for refraining from transmitting on the third set of resources in response to receiving the second message.

Additionally, or alternatively, the communications manager 1020 may support wireless communications at a first UE in accordance with examples as disclosed herein. In some examples, the connection component 1025 may be configured as or otherwise support a means for communicating one or more messages associated with establishing a sidelink communication connection with each of a set of UEs. In some examples, the message component 1030 may be configured as or otherwise support a means for receiving, from a second UE of the set of UEs, a message indicating that the second UE has a data transmission for one or more UEs of the set of UEs based on communicating the one or more messages associated with establishing the sidelink communication connection. The selection component 1045 may be configured as or otherwise support a means for selecting a first set of resources for the data transmission based on receiving the message. The broadcast component 1050 may be configured as or otherwise support a means for broadcasting, to the set of UEs and over a second set of resources, an indication that the first set of resources is allocated to the second UE for the data transmission.

In some examples, to support broadcasting the indication, the broadcast component 1050 may be configured as or otherwise support a means for transmitting, to a subset of the set of UEs, a second message including a second indication that the first set of resources is allocated for the data transmission, in which the subset of the set of UEs includes one or more scheduling UEs.

In some examples, the second message includes a MAC-CE message, a radio resource control message, a sidelink control information message, a broadcast message, a groupcast message, one or more unicast messages, or any combination thereof.

In some examples, the scheduling component 1065 may be configured as or otherwise support a means for receiving coordination information from one or more UEs of the set of UEs. In some examples, the scheduling component 1065 may be configured as or otherwise support a means for transmitting, to the second UE, scheduling information associated with the first set of resources that is allocated for the data transmission based on the coordination information.

In some examples, the message component 1030 may be configured as or otherwise support a means for receiving one or more second messages from at least a subset of the set of UEs. In some examples, the scheduling component 1065 may be configured as or otherwise support a means for updating a reservation table in accordance with the received one or more second messages, the reservation table indicating resources reserved by the subset of the set of UEs.

In some examples, the scheduling component 1065 may be configured as or otherwise support a means for transmitting scheduling information to the second UE in response to receiving the message indicating that the second UE has a data transmission, the scheduling information indicating a subset of resources including at least the first set of resources. In some examples, the second indication component 1060 may be configured as or otherwise support a means for receiving a second indication that the first set of resources is allocated to the second UE, in which receiving the data transmission is based on receiving the second indication.

In some examples, the indication component 1035 may be configured as or otherwise support a means for transmitting, to the second UE, an indication to activate sensing of the subset of resources.

In some examples, the scheduling component 1065 may be configured as or otherwise support a means for receiving, from a third UE, a second message indicating a reservation of a third set of resources. In some examples, the message component 1030 may be configured as or otherwise support a means for transmitting, to the second UE, a third message indicating that the third set of resources is preempted based on a priority of another transmission associated with the reservation of the third set of resources being higher than a priority of a transmission for the second UE using the third set of resources.

Figure 11:
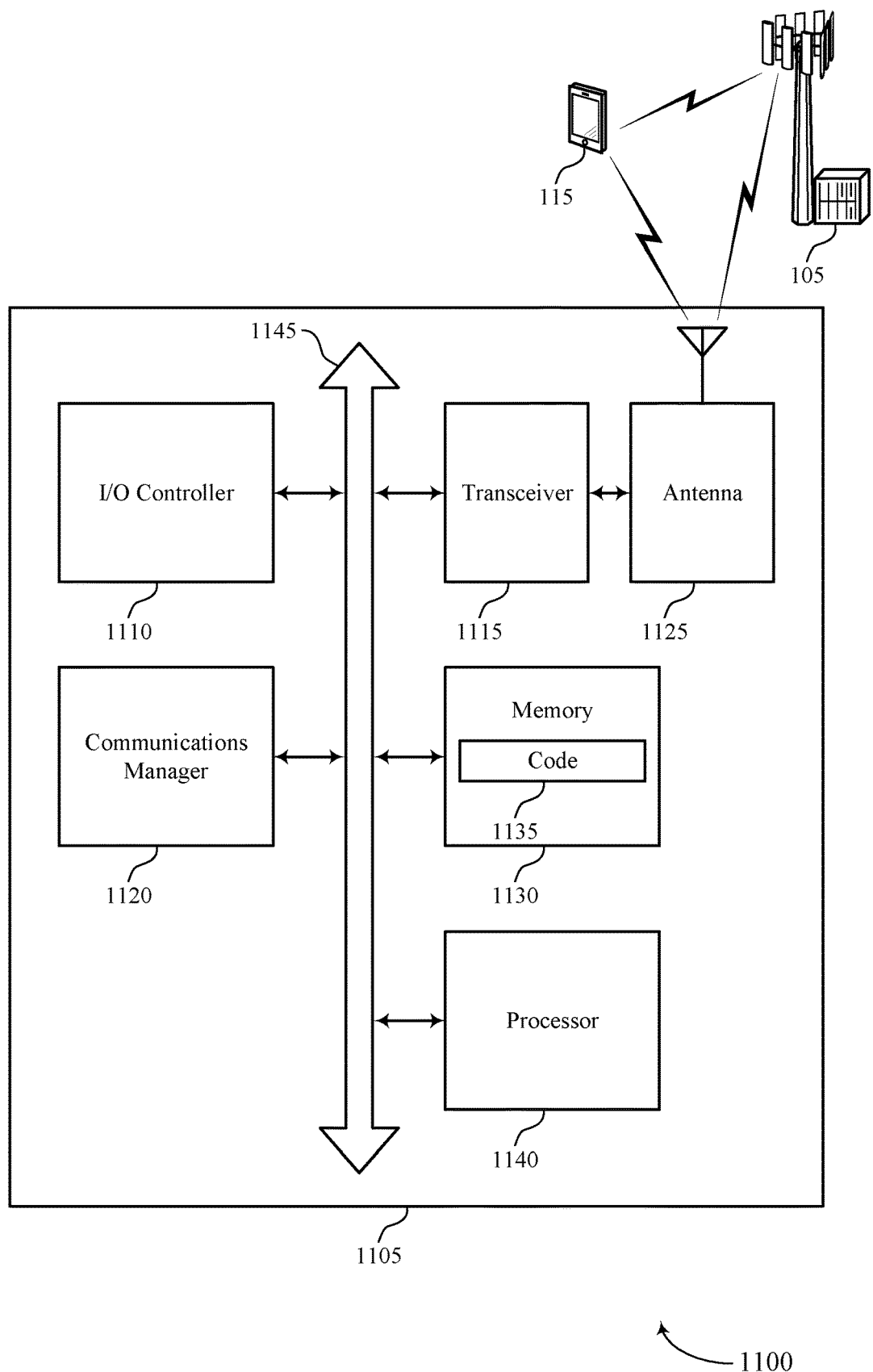
FIG. 11 shows a diagram of a system including a device that supports inter-UE scheduling for sidelink communications in accordance with one or more aspects of the present disclosure.

FIG. 11 shows a diagram of a system 1100 including a device 1105 that supports inter-UE scheduling for sidelink communications in accordance with one or more aspects of the present disclosure. The device 1105 may be an example of or include the components of a device 805, a device 905, or a UE 115. The device 1105 may communicate (for example, wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (for example, operatively, communicatively, functionally, electronically, electrically) via one or more buses (for example, a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof.

The memory 1130 may include random access memory (RAM) and read-only memory (ROM). The memory 1130 may store computer-readable, computer-executable code 1135 including instructions that, examples in which executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (for example, examples in which compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting scheduling techniques for sidelink communications). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for communicating one or more messages associated with establishing a sidelink communication connection with each of a set of UEs. The communications manager 1120 may be configured as or otherwise support a means for transmitting, to a second UE of the set of UEs based on communicating the one or more messages associated with establishing the sidelink communication connection, a message indicating that the first UE has a data transmission for one or more UEs of the set of UEs. The communications manager 1120 may be configured as or otherwise support a means for receiving, from the second UE and broadcasted over a second set of resources, an indication that a first set of resources is allocated to the first UE for the data transmission. The communications manager 1120 may be configured as or otherwise support a means for transmitting the data transmission over the first set of resources based on receiving the indication that the first set of resources is allocated to the first UE for the data transmission.

Additionally, or alternatively, the communications manager 1120 may support wireless communications at a first UE in accordance with examples as disclosed herein. For example, the communications manager 1120 may be configured as or otherwise support a means for communicating one or more messages associated with establishing a sidelink communication connection with each of a set of UEs. The communications manager 1120 may be configured as or otherwise support a means for receiving, from a second UE of the set of UEs, a message indicating that the second UE has a data transmission for one or more UEs of the set of UEs based on communicating the one or more messages associated with establishing the sidelink communication connection. The communications manager 1120 may be configured as or otherwise support a means for selecting a first set of resources for the data transmission based on receiving the message. The communications manager 1120 may be configured as or otherwise support a means for broadcasting, to the set of UEs and over a second set of resources, an indication that the first set of resources being allocated to the second UE for the data transmission.

By including or configuring the communications manager 1120 in accordance with examples, the device 1105 may support techniques for sidelink inter-UE scheduling. For example, such techniques may enable the device 1105 to avoid or reduce the likelihood of interference with communications in the system, which may result in reduced processing power, reduced power consumption, increased communications reliability and efficiency, or any combination thereof, among other examples of advantages at the device 1105.

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of scheduling techniques for sidelink communications, or the processor 1140 and the memory 1130 may be otherwise configured to perform or support such operations.

Figure 12:
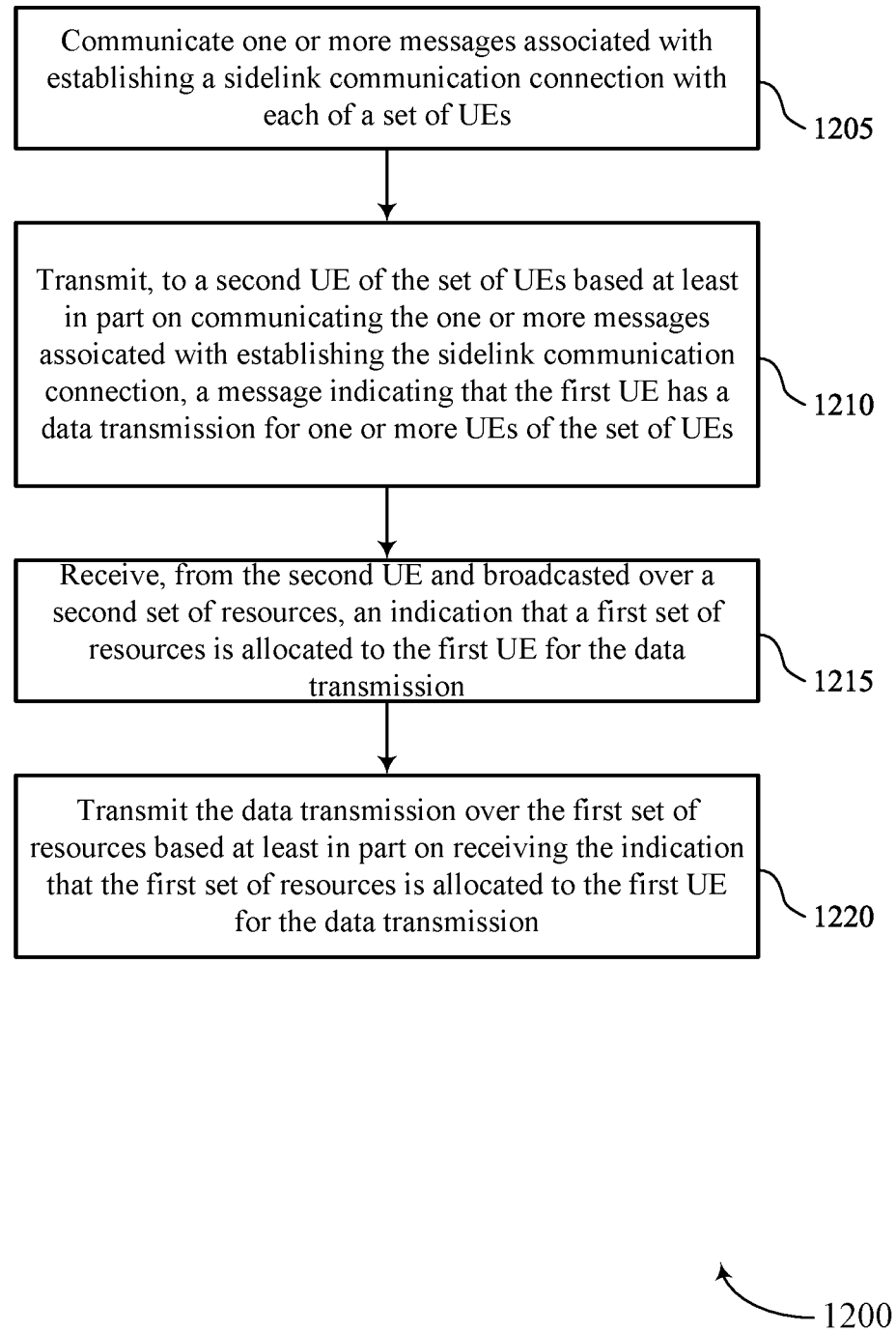
FIGS. 12-15 show flowcharts illustrating methods that support inter-UE scheduling for sidelink communications in accordance with one or more aspects of the present disclosure.

FIG. 12 shows a flowchart illustrating a method 1200 that supports inter-UE scheduling for sidelink communications in accordance with one or more aspects of the present disclosure. The operations of the method 1200 may be implemented by a UE or its components. For example, the operations of the method 1200 may be performed by a UE 115 as described with reference to FIGS. 1-11. In some examples, a UE may execute a set of instructions to control the functional elements of the UE to perform the described functions. Additionally, or alternatively, the UE may perform aspects of the described functions using special-purpose hardware.

At 1205, the method may include communicating one or more messages associated with establishing a sidelink communication connection with each of a set of UEs. The operations of 1205 may be performed in accordance with examples as disclosed herein. In some examples, aspects of the operations of 1205 may be performed by a connection component 1025 as described with reference to FIG. 10.

At 1210, the method may include transmitting, to a second UE of the set of UEs based on communicating the one or more messages associated with establishing the sidelink communication connection, a message indicating that the first UE has a data transmission for one or more UEs of the set of UEs. The operations of 1210 may be performed in accordance with examples as disclosed herein. In some examples, aspects of the operations of 1210 may be performed by a message component 1030 as described with reference to FIG. 10.

At 1215, the method may include receiving, from the second UE and broadcasted over a second set of resources, an indication that a first set of resources is allocated to the first UE for the data transmission. The operations of 1215 may be performed in accordance with examples as disclosed herein. In some examples, aspects of the operations of 1215 may be performed by an indication component 1035 as described with reference to FIG. 10.

At 1220, the method may include transmitting the data transmission over the first set of resources based on receiving the indication that the first set of resources is allocated to the first UE for the data transmission. The operations of 1220 may be performed in accordance with examples as disclosed herein. In some examples, aspects of the operations of 1220 may be performed by a data component 1040 as described with reference to FIG. 10.

Figure 13:
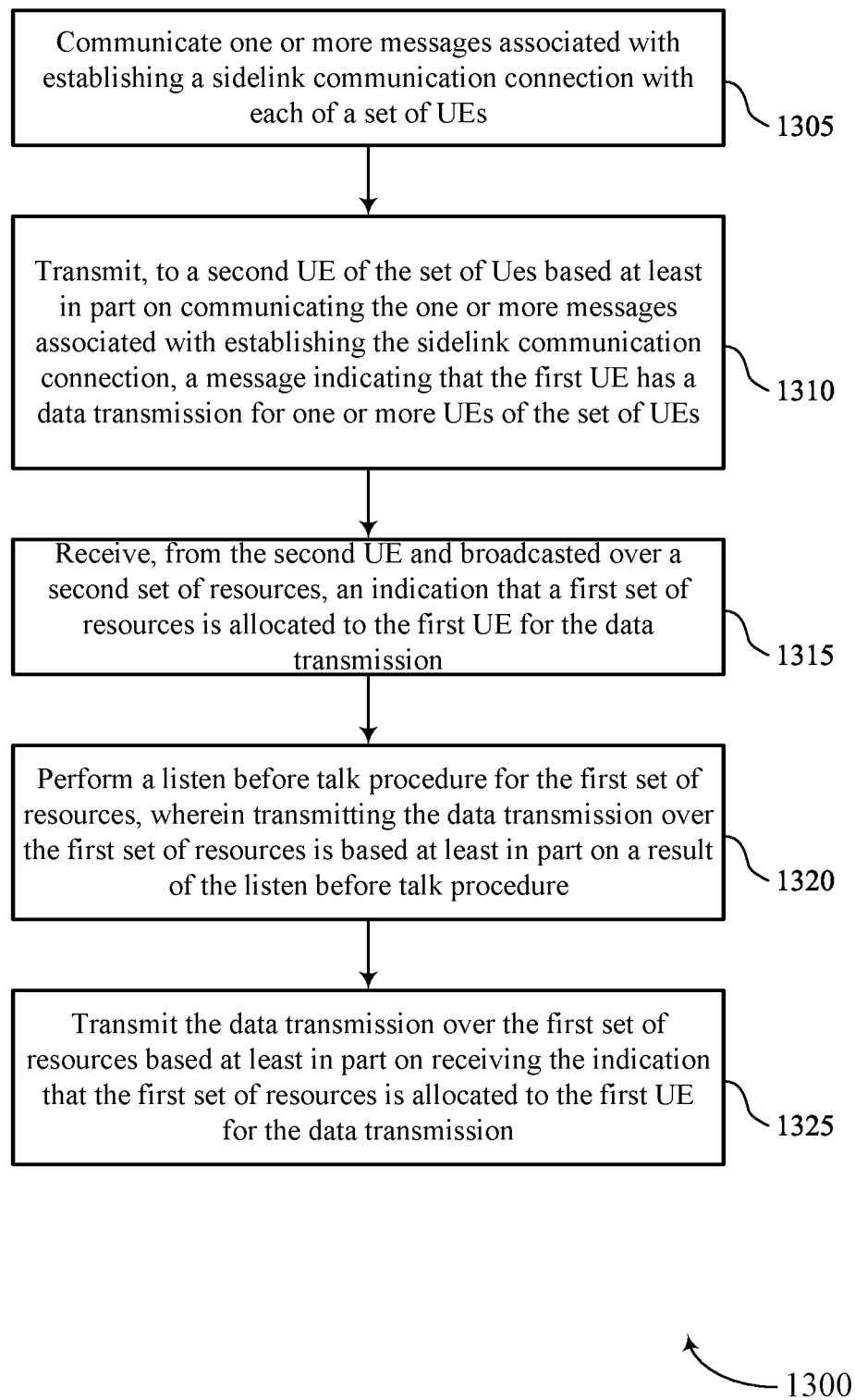

FIG. 13 shows a flowchart illustrating a method 1300 that supports inter-UE scheduling for sidelink communications in accordance with one or more aspects of the present disclosure. The operations of the method 1300 may be implemented by a UE or its components. For example, the operations of the method 1300 may be performed by a UE 115 as described with reference to FIGS. 1-11. In some examples, a UE may execute a set of instructions to control the functional elements of the UE to perform the described functions. Additionally, or alternatively, the UE may perform aspects of the described functions using special-purpose hardware.

At 1305, the method may include communicating one or more messages associated with establishing a sidelink communication connection with each of a set of UEs. The operations of 1305 may be performed in accordance with examples as disclosed herein. In some examples, aspects of the operations of 1305 may be performed by a connection component 1025 as described with reference to FIG. 10.

At 1310, the method may include transmitting, to a second UE of the set of UEs based on communicating the one or more messages associated with establishing the sidelink communication connection, a message indicating that the first UE has a data transmission for one or more UEs of the set of UEs. The operations of 1310 may be performed in accordance with examples as disclosed herein. In some examples, aspects of the operations of 1310 may be performed by a message component 1030 as described with reference to FIG. 10.

At 1315, the method may include receiving, from the second UE and broadcasted over a second set of resources, an indication that a first set of resources is allocated to the first UE for the data transmission. The operations of 1315 may be performed in accordance with examples as disclosed herein. In some examples, aspects of the operations of 1315 may be performed by an indication component 1035 as described with reference to FIG. 10.

At 1320, the method may include performing a listen before talk procedure for the first set of resources, in which transmitting the data transmission over the first set of resources is based on a result of the listen before talk procedure. The operations of 1320 may be performed in accordance with examples as disclosed herein. In some examples, aspects of the operations of 1320 may be performed by an LBT component 1055 as described with reference to FIG. 10.

At 1325, the method may include transmitting the data transmission over the first set of resources based on receiving the indication that the first set of resources is allocated to the first UE for the data transmission. The operations of 1325 may be performed in accordance with examples as disclosed herein. In some examples, aspects of the operations of 1325 may be performed by a data component 1040 as described with reference to FIG. 10.

Figure 14:
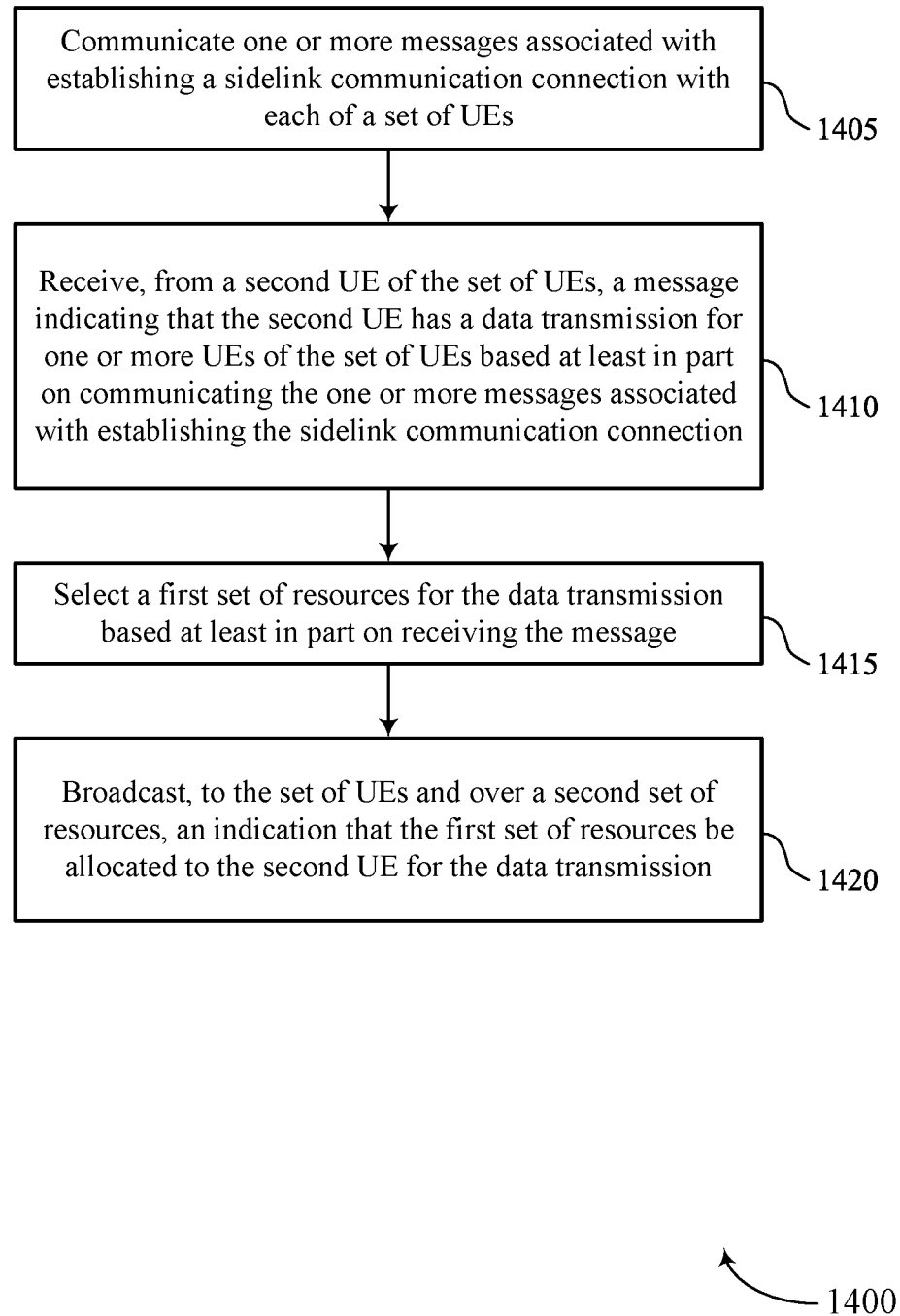

FIG. 14 shows a flowchart illustrating a method 1400 that supports inter-UE scheduling for sidelink communications in accordance with one or more aspects of the present disclosure. The operations of the method 1400 may be implemented by a UE or its components. For example, the operations of the method 1400 may be performed by a UE 115 as described with reference to FIGS. 1-11. In some examples, a UE may execute a set of instructions to control the functional elements of the UE to perform the described functions. Additionally, or alternatively, the UE may perform aspects of the described functions using special-purpose hardware.

At 1405, the method may include communicating one or more messages associated with establishing a sidelink communication connection with each of a set of UEs. The operations of 1405 may be performed in accordance with examples as disclosed herein. In some examples, aspects of the operations of 1405 may be performed by a connection component 1025 as described with reference to FIG. 10.

At 1410, the method may include receiving, from a second UE of the set of UEs, a message indicating that the second UE has a data transmission for one or more UEs of the set of UEs based on communicating the one or more messages associated with establishing the sidelink communication connection. The operations of 1410 may be performed in accordance with examples as disclosed herein. In some examples, aspects of the operations of 1410 may be performed by a message component 1030 as described with reference to FIG. 10.

At 1415, the method may include selecting a first set of resources for the data transmission based on receiving the message. The operations of 1415 may be performed in accordance with examples as disclosed herein. In some examples, aspects of the operations of 1415 may be performed by a selection component 1045 as described with reference to FIG. 10.

At 1420, the method may include broadcasting, to the set of UEs and over a second set of resources, an indication that the first set of resources is allocated to the second UE for the data transmission. The operations of 1420 may be performed in accordance with examples as disclosed herein. In some examples, aspects of the operations of 1420 may be performed by a broadcast component 1050 as described with reference to FIG. 10.

Figure 15:
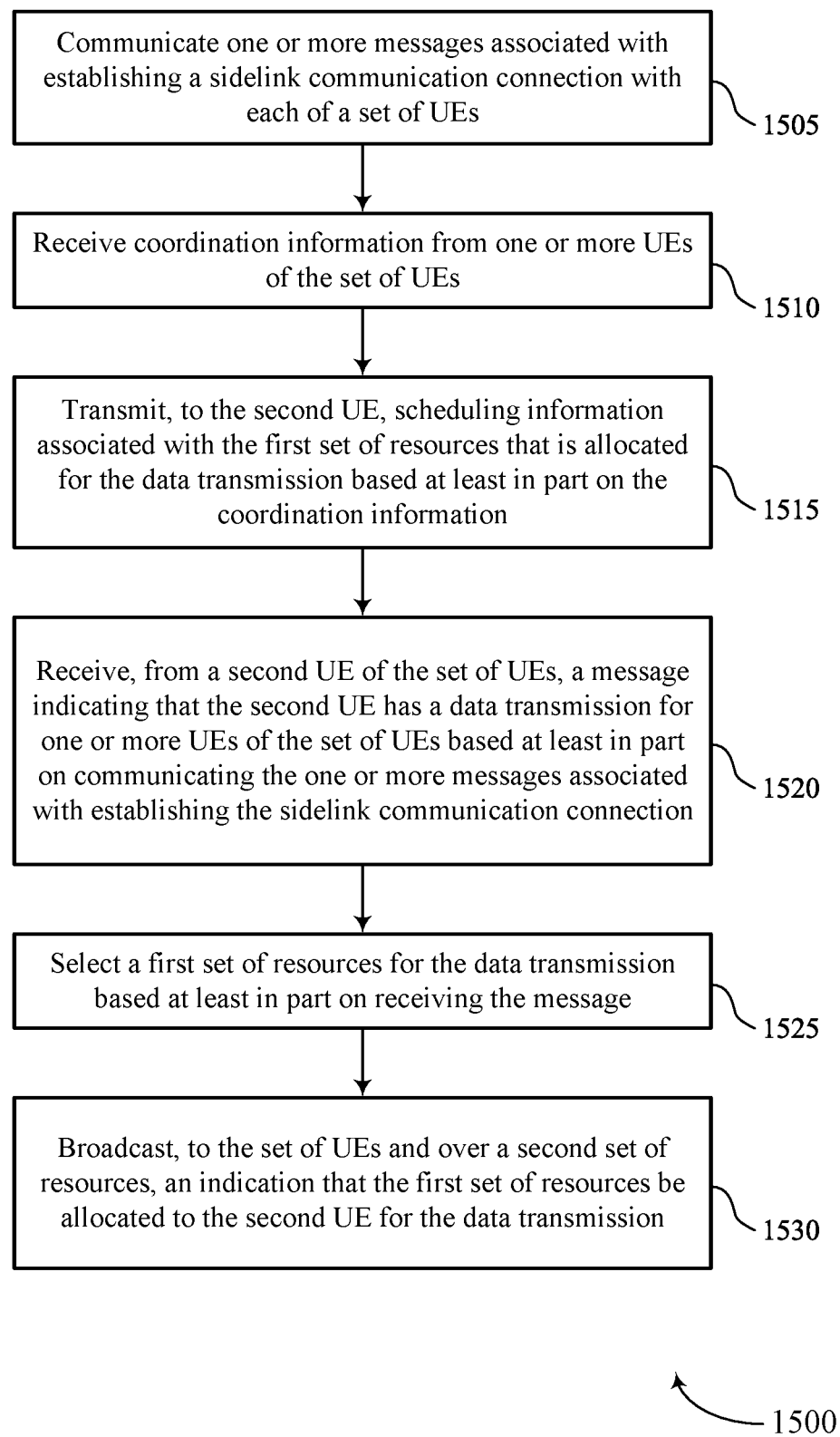

FIG. 15 shows a flowchart illustrating a method 1500 that supports inter-UE scheduling for sidelink communications in accordance with one or more aspects of the present disclosure. The operations of the method 1500 may be implemented by a UE or its components. For example, the operations of the method 1500 may be performed by a UE 115 as described with reference to FIGS. 1-11. In some examples, a UE may execute a set of instructions to control the functional elements of the UE to perform the described functions. Additionally, or alternatively, the UE may perform aspects of the described functions using special-purpose hardware.

At 1505, the method may include communicating one or more messages associated with establishing a sidelink communication connection with each of a set of UEs. The operations of 1505 may be performed in accordance with examples as disclosed herein. In some examples, aspects of the operations of 1505 may be performed by a connection component 1025 as described with reference to FIG. 10.

At 1510, the method may include receiving coordination information from one or more UEs of the set of UEs. The operations of 1510 may be performed in accordance with examples as disclosed herein. In some examples, aspects of the operations of 1510 may be performed by a scheduling component 1065 as described with reference to FIG. 10.

At 1515, the method may include transmitting, to the second UE, scheduling information associated with the first set of resources that is allocated for the data transmission based on the coordination information. The operations of 1515 may be performed in accordance with examples as disclosed herein. In some examples, aspects of the operations of 1515 may be performed by a scheduling component 1065 as described with reference to FIG. 10.

At 1520, the method may include receiving, from a second UE of the set of UEs, a message indicating that the second UE has a data transmission for one or more UEs of the set of UEs based on communicating the one or more messages associated with establishing the sidelink communication connection. The operations of 1520 may be performed in accordance with examples as disclosed herein. In some examples, aspects of the operations of 1520 may be performed by a message component 1030 as described with reference to FIG. 10.

At 1525, the method may include selecting a first set of resources for the data transmission based on receiving the message. The operations of 1525 may be performed in accordance with examples as disclosed herein. In some examples, aspects of the operations of 1525 may be performed by a selection component 1045 as described with reference to FIG. 10.

At 1530, the method may include broadcasting, to the set of UEs and over a second set of resources, an indication that the first set of resources is allocated to the second UE for the data transmission. The operations of 1530 may be performed in accordance with examples as disclosed herein. In some examples, aspects of the operations of 1530 may be performed by a broadcast component 1050 as described with reference to FIG. 10.

The following provides an overview of aspects of the present disclosure:

Aspect 1: A method for wireless communication at a first UE, comprising: communicating one or more messages associated with establishing a sidelink communication connection with each of a set of UEs; transmitting, to a second UE of the set of UEs based at least in part on communicating the one or more messages associated with establishing the sidelink communication connection, a message indicating that the first UE has a data transmission for one or more UEs of the set of UEs; receiving, from the second UE and broadcasted over a second set of resources, an indication that a first set of resources is allocated to the first UE for the data transmission; and transmitting the data transmission over the first set of resources based at least in part on receiving the indication that the first set of resources is allocated to the first UE for the data transmission.

Aspect 2: The method of aspect 1, further comprising performing a listen before talk procedure for the first set of resources, wherein transmitting the data transmission over the first set of resources is based at least in part on a result of the listen before talk procedure.

Aspect 3: The method of aspect 2, wherein performing the listen before talk procedure comprises: determining an energy associated with a subchannel of a band; comparing the energy associated with the subchannel to a threshold; and obtaining the result of the listen before talk procedure based at least in part on the comparison.

Aspect 4: The method of any of aspects 2 through 3, wherein performing the listen before talk procedure comprises monitoring for feedback from a third UE, transmitting the data transmission is based at least in part on monitoring for the feedback from the third UE.

Aspect 5: The method of any of aspects 1 through 4, further comprising transmitting, to at least a subset of the set of UEs, a second indication that the first set of resources is allocated to the first UE based at least in part on receiving the indication.

Aspect 6: The method of aspect 5, wherein the subset of the set of UEs comprises UEs outside of a coverage area of the second UE.

Aspect 7: The method of any of aspects 1 through 6, further comprising: receiving scheduling information from the second UE in response to transmitting the message indicating that the first UE has the data transmission, the scheduling information indicating a subset of resources comprising at least the first set of resources; performing sensing on the subset of resources; and selecting the first set of resources from the subset of resources for the data transmission based at least in part on performing the sensing.

Aspect 8: The method of aspect 7, further comprising receiving, from the second UE, an indication to perform the sensing, wherein performing the sensing is based at least in part on receiving the indication to perform the sensing.

Aspect 9: The method of any of aspects 1 through 8, further comprising: performing sensing on the first set of resources; and transmitting, to the set of UEs based at least in part on performing the sensing on the first set of resources, a second indication that the first set of resources is allocated to the first UE, wherein transmitting the data transmission is based at least in part on transmitting the second indication.

Aspect 10: The method of any of aspects 1 through 9, further comprising: receiving, from a third UE, a second message indicating that a third set of resources are preempted by the third UE; refraining from transmitting on the third set of resources based at least in part on receiving the second message; transmitting a third message to the second UE indicating that the third set of resources is preempted, wherein transmitting the message indicating that the first UE has the data transmission is based at least in part on the third message.

Aspect 11: The method of any of aspects 1 through 10, further comprising: receiving, from the second UE, a second message indicating that a third set of resources is preempted based at least in part on a priority of another transmission; and refraining from transmitting on the third set of resources in response to receiving the second message.

Aspect 12: A method for wireless communication at a first UE, comprising: communicating one or more messages associated with establishing a sidelink communication connection with each of a set of UEs; receiving, from a second UE of the set of UEs, a message indicating that the second UE has a data transmission for one or more UEs of the set of UEs based at least in part on communicating the one or more messages associated with establishing the sidelink communication connection; selecting a first set of resources for the data transmission based at least in part on receiving the message; and broadcasting, to the set of UEs and over a second set of resources, an indication that the first set of resources is allocated to the second UE for the data transmission.

Aspect 13: The method of aspect 12, wherein broadcasting the indication comprises transmitting, to a subset of the set of UEs, a second message comprising a second indication that the first set of resources is allocated for the data transmission, the subset of the set of UEs comprises one or more scheduling UEs.

Aspect 14: The method of aspect 13, wherein the second message comprises a medium access control control element message, a radio resource control message, a sidelink control information message, a broadcast message, a groupcast message, one or more unicast messages, or any combination thereof Aspect 15: The method of any of aspects 12 through 14, further comprising: receiving coordination information from at least one UE of the set of UEs; and transmitting, to the second UE, scheduling information associated with the first set of resources that is allocated for the data transmission based at least in part on the coordination information.

Aspect 16: The method of any of aspects 12 through 15, further comprising: receiving one or more second messages from at least a subset of the set of UEs; and updating a reservation table in accordance with the received one or more second messages, the reservation table indicating resources reserved by the subset of the set of UEs.

Aspect 17: The method of any of aspects 12 through 16, further comprising: transmitting scheduling information to the second UE in response to receiving the message indicating that the second UE has the data transmission, the scheduling information indicating a subset of resources comprising at least the first set of resources; and receiving a second indication that the first set of resources is allocated to the second UE, wherein receiving the data transmission is based at least in part on receiving the second indication.

Aspect 18: The method of aspect 17, further comprising transmitting, to the second UE, an indication to activate sensing of the subset of resources.

Aspect 19: The method of any of aspects 12 through 18, further comprising: receiving, from a third UE, a second message indicating a reservation of a third set of resources; and transmitting, to the second UE, a third message indicating that the third set of resources is preempted based at least in part on a priority of another transmission associated with the reservation of the third set of resources being higher than a priority of a transmission for the second UE using the third set of resources.

Aspect 20: An apparatus for wireless communication at a first UE, comprising a processor; and memory coupled with the processor and storing instructions executable by the processor to cause the apparatus to perform a method of any of aspects 1 through 11.

Aspect 21: An apparatus for wireless communication at a first UE, comprising at least one means for performing a method of any of aspects 1 through 11.

Aspect 22: A non-transitory computer-readable medium storing code for wireless communication at a first UE, the code comprising instructions executable by a processor to perform a method of any of aspects 1 through 11.

Aspect 23: An apparatus for wireless communication at a first UE, comprising a processor; and memory coupled with the processor and storing instructions executable by the processor to cause the apparatus to perform a method of any of aspects 12 through 19.

Aspect 24: An apparatus for wireless communication at a first UE, comprising at least one means for performing a method of any of aspects 12 through 19.

Aspect 25: A non-transitory computer-readable medium storing code for wireless communication at a first UE, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining among other examples. Also, "determining" can include receiving (such as receiving information), accessing (such as accessing data in a memory) among other examples. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communication by a first user equipment (UE), comprising:
   communicating one or more messages associated with establishing a sidelink communication connection with each of a set of UEs;
   transmitting, to a second UE of the set of UEs in accordance with communicating the one or more messages associated with establishing the sidelink communication connection, a message indicating that the first UE has a data transmission for one or more UEs of the set of UEs;
receiving, from the second UE and broadcasted over a second set of resources, an indication that a first set of resources is allocated to the first UE for the data transmission;
receiving, from the second UE, a wake-up signal indicating for the first UE to perform partial sensing on the first set of resources; and
transmitting the data transmission over a subset of the first set of resources in accordance with receiving the indication that the first set of resources is allocated to the first UE for the data transmission and with receiving the wake-up signal, the subset of the first set of resources being in accordance with the partial sensing on the first set of resources.

2. The method of claim 1, further comprising removing a second subset of resources from the first set of resources in accordance with the partial sensing, wherein the second subset of resources have an energy metric indicating that the second subset of resources are occupied, and wherein transmitting the data transmission over the subset of the first set of resources is in accordance with removing the second subset of resources.

3. The method of claim 1, further comprising transmitting, to at least a subset of the set of UEs, a second indication that the subset of the first set of resources is allocated to the first UE in accordance with receiving the indication.

4. The method of claim 3, wherein the subset of the set of UEs comprises UEs outside of a coverage area of the second UE.

5. The method of claim 1, further comprising:
performing the partial sensing on the first set of resources; and
selecting the subset of the first set of resources for the data transmission in accordance with performing the partial sensing.

6. The method of claim 1, further comprising:
performing partial sensing on the first set of resources; and
transmitting, to the set of UEs in accordance with performing the partial sensing on the first set of resources, a second indication that the subset of the first set of resources is allocated to the first UE, wherein transmitting the data transmission is in accordance with transmitting the second indication.

7. The method of claim 1, further comprising:
receiving, from a third UE, a second message indicating that a third set of resources are preempted by the third UE;
refraining from transmitting on the third set of resources in accordance with receiving the second message; and
transmitting a third message to the second UE indicating that the third set of resources is preempted, wherein transmitting the message indicating that the first UE has the data transmission is in accordance with the third message.

8. The method of claim 1, further comprising:
receiving, from the second UE, a second message indicating that a third set of resources is preempted in accordance with a priority of another transmission; and
refraining from transmitting on the third set of resources in response to receiving the second message.

9. The method of claim 1, wherein the partial sensing comprises:
sensing a second subset of the first set of resources in accordance with receiving the wake-up signal; and
selecting the subset of the first set of resources from the second subset of the first set of resources in accordance with sensing the second subset of the first set of resources.

10. A method for wireless communication by a first user equipment (UE), comprising:
communicating one or more messages associated with establishing a sidelink communication connection with each of a set of UEs;
receiving, from a second UE of the set of UEs, a message indicating that the second UE has a data transmission for one or more UEs of the set of UEs in accordance with communicating the one or more messages associated with establishing the sidelink communication connection;
selecting a first set of resources for the data transmission in accordance with receiving the message;
broadcasting, to the set of UEs and over a second set of resources, an indication that the first set of resources is allocated to the second UE for the data transmission;
transmitting, to the second UE, a wake-up signal indicating for the second UE to perform partial sensing on the first set of resources in accordance with broadcasting the indication; and
receiving, from the second UE, the data transmission via a subset of the first set of resources in accordance with transmitting the wake-up signal and broadcasting the indication, the subset of the first set of resources being in accordance with the partial sensing.

11. The method of claim 10, wherein broadcasting the indication comprises transmitting, to a subset of the set of UEs, a second message comprising a second indication that the first set of resources is allocated for the data transmission, wherein the subset of the set of UEs comprises one or more scheduling UEs.

12. The method of claim 11, wherein the second message comprises one or more of a medium access control control element message, a radio resource control message, a sidelink control information message, a broadcast message, a groupcast message, or one or more unicast messages.

13. The method of claim 10, further comprising:
receiving coordination information from at least one UE of the set of UEs; and
transmitting, to the second UE, scheduling information associated with the first set of resources that is allocated for the data transmission in accordance with the coordination information.

14. The method of claim 10, further comprising:
receiving one or more second messages from at least a subset of the set of UEs; and
updating a reservation table in accordance with the received one or more second messages, the reservation table indicating resources reserved by the subset of the set of UEs.

15. The method of claim 10, further comprising:
receiving a second indication that the subset of the first set of resources is allocated to the second UE, wherein receiving the data transmission is in accordance with receiving the second indication.

16. The method of claim 10, further comprising:
receiving, from a third UE, a second message indicating a reservation of a third set of resources; and
transmitting, to the second UE, a third message indicating that the third set of resources is preempted in accordance with a priority of another transmission associated with the reservation of the third set of resources being higher than a priority of a transmission for the second UE using the third set of resources.

17. A first user equipment (UE), comprising:
at least one processor; and
at least one memory coupled with the at least one processor and storing instructions executable by the at least one processor to cause the apparatus first UE to:
communicate one or more messages associated with establishing a sidelink communication connection with each of a set of UEs;
transmit, to a second UE of the set of UEs in accordance with communicating the one or more messages associated with establishing the sidelink communication connection, a message indicating that the first UE has a data transmission for one or more UEs of the set of UEs;
receive, from the second UE and broadcasted over a second set of resources, an indication that a first set of resources is allocated to the first UE for the data transmission;
receive, from the second UE, a wake-up signal indicating for the first UE to perform partial sensing on the first set of resources in accordance with receiving the indication; and
transmit the data transmission over a subset of the first set of resources in accordance with receiving the indication that the first set of resources is allocated to the first UE for the data transmission and with receiving the wake-up signal, the subset of the first set of resources being in accordance with the partial sensing on the first set of resources.

18. The first UE of claim 17, wherein the instructions are further executable by the at least one processor to cause the first UE to remove a second subset of resources from the first set of resources in accordance with the partial sensing, wherein the second subset of resources have an energy metric indicating that the second subset of resources are occupied, and wherein transmitting the data transmission over the subset of the first set of resources is in accordance with removal of the second subset of resources from the first set of resources.

19. The first UE of claim 17, wherein the instructions are further executable by the at least one processor to cause the first UE to transmit, to at least a subset of the set of UEs, a second indication that the subset of the first set of resources is allocated to the first UE in accordance with receiving the indication.

20. The first UE of claim 19, wherein the subset of the set of UEs comprises UEs outside of a coverage area of the second UE.

21. The first UE of claim 17, wherein the instructions are further executable by the at least one processor to cause the first UE to:
perform the partial sensing on the first set of resources; and
select the subset of the first set of resources for the data transmission in accordance with performing the partial sensing.

22. The first UE of claim 17, wherein the instructions are further executable by the at least one processor to cause the first UE to:
perform the partial sensing on the first set of resources; and
transmit, to the set of UEs in accordance with performing the partial sensing on the first set of resources, a second indication that the subset of the first set of resources is allocated to the first UE, wherein transmitting the data transmission is in accordance with transmitting the second indication.

23. The first UE of claim 17, wherein, to perform the partial sensing, the instructions are further executable by the at least one processor to cause the first UE to:
sense a second subset of the first set of resources in accordance with receiving the wake-up signal; and
select the subset of the first set of resources from the second subset of the first set of resources in accordance with sensing the second subset of the first set of resources.

24. A first user equipment (UE), comprising:
at least one processor; and
at least one memory coupled with the at least one processor and storing instructions executable by the at least one processor to cause the first UE to:
communicate one or more messages associated with establishing a sidelink communication connection with each of a set of UEs;
receive, from a second UE of the set of UEs, a message indicating that the second UE has a data transmission for one or more UEs of the set of UEs in accordance with communicating the one or more messages associated with establishing the sidelink communication connection;
select a first set of resources for the data transmission in accordance with receiving the message;
broadcasting, to the set of UEs and over a second set of resources, an indication that the first set of resources be allocated to the second UE for the data transmission;
transmit, to the second UE, a wake-up signal indicating for the second UE to perform partial sensing on the first set of resources in accordance with broadcasting the indication; and
receive, from the second UE, the data transmission via a subset of the first set of resources in accordance with transmitting the wake-up signal and broadcasting the indication, the subset of the first set of resources being in accordance with the partial sensing.

25. The first UE of claim 24, wherein the instructions to broadcast the indication are executable by the at least one processor to cause the first UE to transmit, to a subset of the set of UEs, a second message comprising a second indication that the first set of resources is allocated for the data transmission, wherein the subset of the set of UEs comprises one or more scheduling UEs.

* * * * *